United States Patent
Yang et al.

(10) Patent No.: US 9,538,111 B2
(45) Date of Patent: Jan. 3, 2017

(54) CORRELATED DOUBLE SAMPLING CIRCUIT, ANALOG TO DIGITAL CONVERTER AND IMAGE SENSOR INCLUDING THE SAME

(71) Applicants: Han Yang, Seoul (KR); Kwang-Hyun Lee, Seongnam-si (KR)

(72) Inventors: Han Yang, Seoul (KR); Kwang-Hyun Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/527,049

(22) Filed: Oct. 29, 2014

(65) Prior Publication Data
US 2015/0189209 A1  Jul. 2, 2015

(30) Foreign Application Priority Data
Dec. 26, 2013 (KR) .......... 10-2013-0164302

(51) Int. Cl.
H04N 5/335 (2011.01)
H04N 5/378 (2011.01)
H04N 5/365 (2011.01)
H04N 5/357 (2011.01)

(52) U.S. Cl.
CPC ............ *H04N 5/378* (2013.01); *H04N 5/3575* (2013.01); *H04N 5/365* (2013.01)

(58) Field of Classification Search
CPC ...... H04N 5/374; H04N 5/3745; H04N 5/378; H04N 5/3575; H04N 5/365
See application file for complete search history.

(56) References Cited

U.S. PATENT DOCUMENTS

| | | |
|---|---|---|
| 6,818,933 B2 | 11/2004 | Henderson et al. |
| 7,116,138 B2 | 10/2006 | Lim |
| 7,218,260 B2 | 5/2007 | Lim |
| 7,280,140 B2 | 10/2007 | Henderson |
| 7,443,435 B2 | 10/2008 | Loose |
| 7,492,401 B2 | 2/2009 | Lim |
| 7,646,410 B2 | 1/2010 | Lim |
| 7,880,779 B2 | 2/2011 | Storm |
| 7,961,238 B2 | 6/2011 | Nitta et al. |
| 8,300,123 B2 | 10/2012 | Willassen |

(Continued)

FOREIGN PATENT DOCUMENTS

EP  2568699 A2  3/2013

*Primary Examiner* — Aung S Moe
*Assistant Examiner* — John H Morehead, III
(74) *Attorney, Agent, or Firm* — Myers Bigel, P.A.

(57) ABSTRACT

An image sensor includes a sampling circuit, which is responsive to ramp and input signals provided by a pixel array. The sampling circuit is configured to perform a correlated double sampling (CDS) operation on a reset component of the input signal and an image component of the input signal. A reset circuit is also provided, which is configured to reset an output signal generated by the sampling circuit to a first level in response to a reset control signal. This reset control signal can be active during at least one of a first reset interval and a second reset interval. The first reset interval precedes a first comparison interval during which a first comparison operation is performed on the ramp signal and the reset component. The second reset interval precedes a second comparison interval during which a second comparison operation is performed on the ramp signal and the image component.

18 Claims, 23 Drawing Sheets

(56) References Cited

U.S. PATENT DOCUMENTS

| | | | |
|---|---|---|---|
| 8,379,127 B2 | 2/2013 | Jung et al. | |
| 8,390,486 B2 | 3/2013 | Wang et al. | |
| 8,446,483 B2 | 5/2013 | Ui et al. | |
| 2006/0170795 A1* | 8/2006 | Higuchi | H04N 5/3575 348/241 |
| 2011/0234867 A1* | 9/2011 | Sato | H04N 5/3575 348/294 |
| 2011/0248145 A1 | 10/2011 | Tanaka | |
| 2011/0248149 A1* | 10/2011 | Sato | H04N 5/374 250/214 P |
| 2012/0038809 A1 | 2/2012 | Lee et al. | |
| 2012/0039548 A1* | 2/2012 | Wang | H03M 1/1009 382/312 |
| 2012/0199724 A1* | 8/2012 | Nomura | H04N 5/3454 250/208.1 |
| 2012/0318963 A1 | 12/2012 | Van Blerkom | |
| 2013/0100326 A1 | 4/2013 | Ueno | |
| 2013/0112852 A1* | 5/2013 | Kizuna | H04N 5/378 250/208.1 |
| 2014/0078360 A1* | 3/2014 | Park | H04N 5/355 348/294 |
| 2014/0232919 A1* | 8/2014 | Tanaka | H04N 5/365 348/308 |
| 2015/0009379 A1* | 1/2015 | Yan | H04N 5/3559 348/302 |
| 2015/0237274 A1* | 8/2015 | Yang | H04N 5/378 348/308 |

* cited by examiner

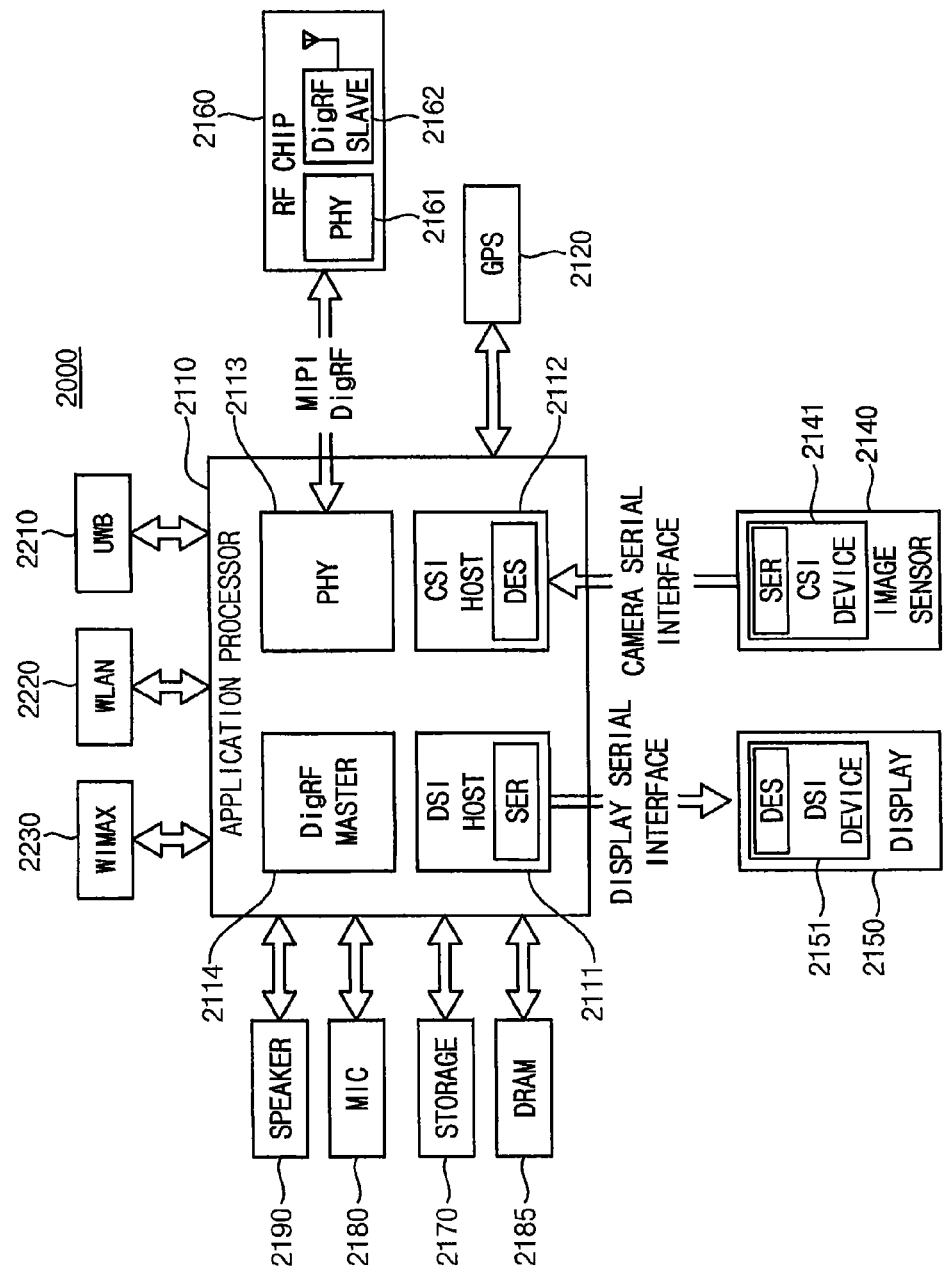

CORRELATED DOUBLE SAMPLING CIRCUIT, ANALOG TO DIGITAL CONVERTER AND IMAGE SENSOR INCLUDING THE SAME

REFERENCE TO PRIORITY APPLICATION

This application claims priority under 35 USC §119 to Korean Patent Application No. 10-2013-0164302, filed on Dec. 26, 2013 in the Korean Intellectual Property Office (KIPO), the content of which is hereby incorporated herein by reference in its entirety.

BACKGROUND

1. Technical Field

Example embodiments relate to correlated double sampling, and more particularly to correlated double sampling circuits, analog to digital converters and image sensors including the same.

2. Description of the Related Art

Charge coupled device (CCD) image sensors and complementary metal-oxide semiconductor (CMOS) image sensors have been used as devices for taking images. In general, analog pixel signals output from pixel arrays of the CMOS image sensors may have variations due to the difference between intrinsic characteristics of pixels, such as fixed pattern noise (FPN). To reduce the FPN, a correlated double sampling (CDS) technology may be used to operate the CMOS image sensors.

SUMMARY

Some example embodiments provide a correlated double sampling (CDS) circuit capable of increasing operating speed by reducing settling time of comparator output. Some additional embodiments provide an analog-to-digital converter (ADC) including the CDS circuit capable of increasing operating speed. Some further embodiments provide an image sensor capable of reducing fixed pattern noise, which employs the ADC.

According to some example embodiments, a CDS circuit includes a sampling unit and an output reset unit. The sampling unit performs a CDS operation on a reset component of an input signal and an image component of the input signal based on a ramp signal and is configured to generate an output signal and the input signal is provided from a pixel array. The output reset unit resets the output signal to a level of a reference voltage based on a reset control signal which is activated during at least one of a first reset interval and a second reset interval. The first reset interval precedes a first comparison interval in which a first comparison operation is performed on the ramp signal and the reset component and the second reset interval precedes a second comparison interval in which a second comparison operation is performed on the ramp signal and the image component.

In some embodiments, the sampling unit may include a comparator that compares the ramp signal and the input signal to provide the output signal at an output node and the output reset unit may include a reset switch that connects the reference voltage to the output node during at least one of the first and second reset interval. The first reset interval may be substantially same as the second reset interval.

The comparator may include a bias unit and a comparison unit. The bias unit may be connected between a power supply voltage and a first node. The comparison unit, connected between the bias unit and a ground voltage, compares the ramp signal and the input signal to generate the output signal, and the reference voltage has a level of the power supply voltage. The bias unit may include a first p-channel metal-oxide semiconductor (PMOS) transistor connected between the power supply voltage and the first node and the first PMOS transistor adjusts a current provided to the comparison unit, in response to a bias voltage which is applied to a gate of the first PMOS transistor.

The comparison unit may include a second PMOS transistor, connected to the first node, which has a gate receiving the ramp signal; a third PMOS transistor, connected to the first node in parallel with the second PMOS transistor, which has a gate receiving the input signal; a first n-channel metal-oxide semiconductor (NMOS) transistor, which has a drain connected to the second PMOS transistor at a second node and a source connected to the power supply voltage; and a second NMOS transistor, which has a drain connected to the third PMOS transistor at a third node and a source connected to the ground voltage. The output signal may be provided at the third node and the first and second NMOS transistors may have a current mirror configuration.

The comparator may include a bias unit and a comparison unit. The bias unit may be connected between a ground voltage and a first node. The comparison unit, connected between the bias unit and a power supply voltage, compares the ramp signal and the input signal to generate the output signal, and the reference voltage has a level of the ground voltage.

The bias unit may include a first n-channel metal-oxide semiconductor (NMOS) transistor connected between the ground voltage and the first node and the first NMOS transistor adjusts a current provided to the comparison unit, in response to a bias voltage which is applied to a gate of the first NMOS transistor.

The comparison unit may include a second NMOS transistor, connected to the first node, which has a gate receiving the ramp signal; a third NMOS transistor, connected to the first node in parallel with the second NMOS transistor, which has a gate receiving the input signal; a first p-channel metal-oxide semiconductor (PMOS) transistor which has a drain connected to the second PMOS transistor at a second node and a source connected to the power supply voltage; and a second PMOS transistor which has a drain connected to the third NMOS transistor at a third node and a source connected to the power voltage. The output signal may be provided at the third node and the first and second PMOS transistors may have a current mirror configuration.

In some embodiments, the CDS circuit may further include an auto-zero switch that connects an input terminal of the sampling unit to an output terminal of the sampling unit in response to an auto-zero control signal during an auto-zero interval preceding the first comparison interval. The input terminal may receive the input signal and the output signal is provided at the output terminal.

The first reset interval may be included in a first precharge interval preceding the first comparison interval and the first reset interval may be not greater than the first precharge interval. The ramp signal may have an offset level during the first precharge interval. The second reset interval may be included in a second precharge interval preceding the second comparison interval and the second reset interval may be smaller than the second precharge interval. The ramp signal may have an offset level during the second precharge interval. In some embodiments, the output reset unit may reset the output signal to the level of the reference voltage to reduce settling time of the output signal during at least one of the first and second reset intervals.

According to example embodiments, an analog to digital converter (ADC) include a CDS circuit and a digital signal generation unit. The CDS circuit samples an input signal to generate an output signal and the input signal is provided from a pixel array. The digital signal generation unit is configured to perform a digital conversion operation on the output signal to generate a digital signal. The CDS circuit includes a sampling unit and an output reset unit. The sampling unit performs a CDS operation on a reset component of the input signal and an image component of the input signal based on a ramp signal and configured to generate the output signal. The output reset unit resets the output signal to a level of a reference voltage based on a reset control signal which is activated during at least one of a first reset interval and a second reset interval. The first reset interval precedes a first comparison interval in which a first comparison operation is performed on the ramp signal and the reset component and the second reset interval precedes a second comparison interval in which a second comparison operation is performed on the ramp signal and the image component.

In some embodiments, the sampling unit may include a comparator that compares the ramp signal and the input signal to provide the output signal at an output node and the output reset unit may include a reset switch that connects the reference voltage to the output node during at least one of the first and second reset interval.

In some embodiments, the digital signal generation unit may include a counter that counts an input clock signal based on the output signal to generate the digital signal during each of the first and second comparison intervals.

In some embodiments, the digital signal generation unit may include a latch circuit that latches a counter clock signal based on the output signal to generate the digital signal during each of the first and second comparison intervals.

According to example embodiments, an image sensor includes a pixel array, a CDS block and a digital signal generation unit. The pixel array includes a plurality of unit pixels that sense an incident light to generate pixel signals corresponding to the incident light. The CDS block performs CDS operation on the pixel signals to generate output signals. The digital signal generation unit performs digital conversion operation on the output signals to generate digital signals corresponding to the output signals. The CDS block includes a plurality of CDS circuits, each connected to each column line of the pixel array. Each of the CDS circuits includes a sampling unit and an output reset unit. The sampling unit performs a CDS operation on a reset component of the pixel signal and an image component of the pixel signal based on a ramp signal and configured to generate the output signal. The output reset unit resets the output signal to a level of a reference voltage based on a reset control signal which is activated during at least one of a first reset interval and a second reset interval. The first reset interval precedes a first comparison interval in which a first comparison operation is performed on the ramp signal and the reset component and the second reset interval precedes a second comparison interval in which a second comparison operation is performed on the ramp signal and the image component.

In some embodiments, the sampling unit may include a comparator that compares the ramp signal and the input signal to provide the output signal at an output node and the output reset unit may include a reset switch that connects the reference voltage to the output node during at least one of the first and second reset interval. In some additional embodiments, the digital signal generation unit may include a plurality of counters, each connected to each of the CDS circuits and each of the counters may count an input clock signal based on the output signal to generate the digital signal during each of the first and second comparison intervals. The image sensor may further include a control unit that provides the input clock signal to the counters.

In some further embodiments, the digital signal generation unit may include a plurality of latch circuits, each connected to each of the CDS circuits and each of the latch circuit may latch a counter clock signal based on the output signal to generate the digital signal during each of the first and second comparison intervals. The image sensor may further include a global counter that generates the counter clock signal to the latch circuits.

Accordingly, the CDS circuit can reset the output signal of the comparator to the level of the reference voltage in response to the reset control signal which is activated during at least one of the first reset interval preceding the first comparison interval in which the first comparison operation is performed on the ramp signal and the reset component and the second reset interval preceding the second comparison interval in which the second comparison operation is performed on the ramp signal and the image component. Therefore, settling time of the comparator may be reduced to increase operating speed.

BRIEF DESCRIPTION OF THE DRAWINGS

Illustrative, non-limiting example embodiments will be more clearly understood from the following detailed description taken in conjunction with the accompanying drawings.

FIG. 31 is a block diagram illustrating an example of an interface used in the mobile device according to example embodiments.

DETAILED DESCRIPTION OF THE EMBODIMENTS

Figure 1:
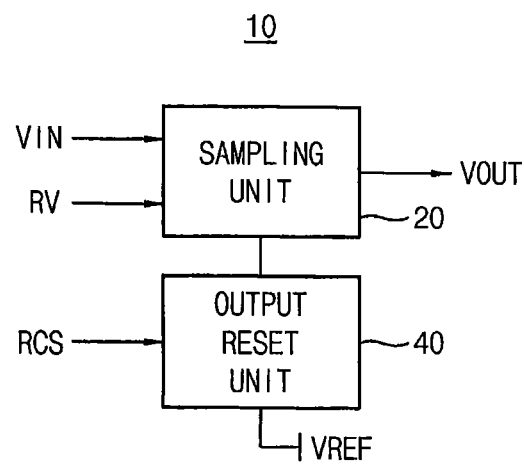
FIG. 1 is a block diagram illustrating a correlated double sampling (CDS) circuit according to some embodiments.

Various example embodiments will be described more fully with reference to the accompanying drawings, in which embodiments are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, decimals, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a correlated double sampling (CDS) circuit according to some embodiments. A CDS circuit 10 illustrated in FIG. 1 may be applicable to an image sensor to perform a CDS operation on an analog pixel signal output from a pixel array. Hereinafter, the example embodiments will be described below based on a complementary metal oxide semiconductor (CMOS) image sensor. However, the CDS circuit 10 according to example embodiments may be used in a charge-coupled device (CCD) image sensor.

Referring to FIG. 1, the CDS circuit 10 may include a sampling unit 20 and an output reset unit 40. The sampling unit 20 performs a CDS operation on a reset component of an input signal VIN provided from a pixel array and an image component of the input signal VIN based on a ramp signal RV and generates an output signal VOUT. An analog pixel signal (e.g., the input signal VIN) output from the pixel array may have variations due to the intrinsic characteristics of pixels, such as fixed pattern noise (FPN), and/or due to the variation in the characteristics of logics for outputting voltage signals from pixels. Accordingly, an effective signal component can be extracted by calculating the difference between a voltage signal based on the reset component and a voltage signal based on the image component. As described above, the reset component and the image component may be detected, and the difference between the reset and image components may be extracted as the effective signal component, which is referred to as the CDS.

The output reset unit 40 is connected to the sampling unit 20. The output reset unit 40 is connected to an output node of the sampling unit 20 and the output reset unit 40 resets the output signal VOUT to a level of a reference voltage VREF based on a reset control signal RCS which is activated during at least one of a first reset interval and a second reset interval. The first reset interval precedes a first comparison interval in which a first comparison operation is performed on the ramp signal RV and the reset component of the input signal VIN and the second reset interval precedes a second comparison interval in which a second comparison operation is performed on the ramp signal RV and the image component of the input signal VIN.

To reduce random noise of an output signal of a CDS circuit, a conventional image sensor employs a multiple sampling technology of averaging noise by performing sampling with respect to a pixel signal, which is output from a pixel array, several times, and/or a technology of improving the SNR (signal-to-noise ratio) characteristic by arranging a programmable gain amplifier (PGA) on the output path of the pixel signal. However, in the conventional image sensor employing the above conventional technologies, the complexity of the signal processing unit in the image sensor may be increased, and thus the size of the image sensor may be increased. In addition, settling time of the output signal VOUT provided from the sampling unit differs depending on a time for the ramp signal RV to reach an offset level, and operating speed increases because a settling time is required for the output signal VOUT to be settled.

However, the CDS circuit 10 may reduce the operating speed because the CDS circuit 10 resets the output signal VOUT to the level of the reference voltage VREF during at least one of the first and second reset intervals and successive operation is triggered without waiting for the output signal VOUT to be settled.

Figure 2:
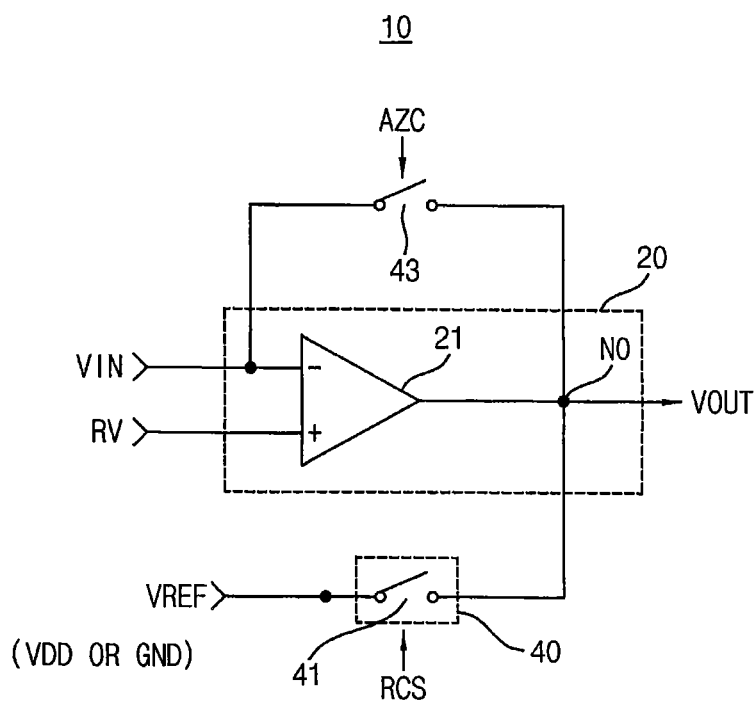
FIG. 2 is a circuit diagram illustrating an example of the CDS circuit of FIG. 1 according to some embodiments.

FIG. 2 is a circuit diagram illustrating an example of the CDS circuit of FIG. 1 according to some embodiments. Referring to FIG. 2, the CDS circuit 10 may include the sampling unit 20 that employs the comparator 21 and the output reset unit 40 that employs a reset switch 41. The CDS circuit 10 may further include an auto-zero switch 43 that selectively connects an output node NO of the comparator 21 to a first input terminal of the comparator 21, which receives the input signal VIN.

The comparator 21 has the first (negative) input terminal receiving the input signal VIN, a second (positive) input terminal receiving the ramp signal RV and an output terminal (or, the output node NO) at which the output signal VOUT is provided.

The reset switch 41 of the output reset unit 40 has a first terminal connected to the reference voltage VREF and a second terminal connected to the output node NO and resets the output signal VOUT to the level of the reference voltage VREF during at least one of the first and second reset interval in response to a reset control signal RCS. The auto-zero switch 43 connects the first input terminal of the comparator 21 to the output node NO of the comparator 21 during a precharge interval preceding the first comparison interval, in response to an auto-zero control signal AZC. The auto-zero switch 43 may remove reset noises of the input signal VIN and offset of the comparator 41 by connecting the first input terminal of the comparator 21 to the output node NO. The reference voltage VREF has a level of a power supply voltage VDD or a ground voltage GND.

Figure 3:
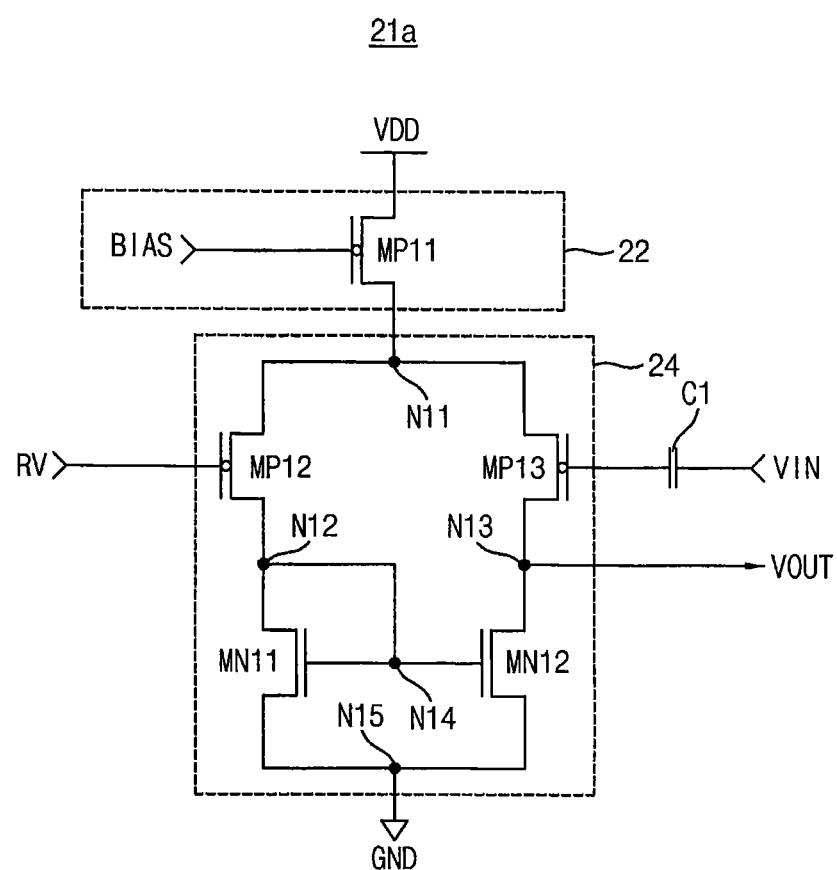
FIG. 3 is a circuit diagram illustrating an example of the comparator in FIG. 2 according to some embodiments.

FIG. 3 is a circuit diagram illustrating an example of the comparator in FIG. 2 according to some embodiments. Referring to FIG. 3, a comparator 21*a* may include a bias unit 22 and a comparison unit 24. The bias unit 22 is connected between the power supply voltage VDD and a first node N11 and the comparison unit 24 is connected between the first node N11 and the ground voltage GND and compares the input signal VIN and the ramp signal RV to generate the output signal VOUT. The bias unit 22 includes a p-channel metal-oxide semiconductor (PMOS) transistor MP11 connected between the power supply voltage VDD and the first node N11 and may adjust an amount of current provided to the comparison unit 24 in response to a bias voltage BIAS which is applied to a gate of the PMOS transistor MP11.

The comparison unit 24 includes PMOS transistors MP12 and MP13 and n-channel metal-oxide semiconductor (NMOS) transistors MN11 and MN12. The PMOS transistor MP12 is connected between the first node N11 and a second node N12 and has a gate receiving the ramp signal RV. The PMOS transistor MP13 is connected between the first node N11 and a third node N13 in parallel with the PMOS transistor MP12 and has a gate receiving the input signal YIN. The NMOS transistor MN11 is connected between the second node N12 and a fifth node N15 and the NMOS transistor MN12 is connected between the third node N13 and the fifth node N15. The NMOS transistors MN11 and MN12 have a current mirror configuration. Gates of the NMOS transistors MN11 and MN12 are connected to a fourth node N14 and the fourth node N14 is connected to the second node N12. The fifth node N15 is connected to the ground voltage GND and the output signal VOUT is provided at the third node N13.

The comparator 21*a* may further include a capacitor that removes direct-current (DC) noise of the input signal VIN. When the comparator 21 in FIG. 2 employs the comparator 21*a* of FIG. 3, the reference voltage VREF may have a level of the power supply voltage VDD. The power supply voltage VDD is connected to the first terminal of the reset switch 41 in FIG. 2 and the reset switch 41 provides the power supply voltage VDD to the output node NO in response to the reset control signal RCS.

Since the comparator 21*a* amplifies difference between the input signal VIN and the ramp signal RV based on the current provided from the bias unit 22 and has limited bandwidth, the comparator 21*a* requires a settling time during which the comparator 21*a* amplifies difference between the input signal VIN and the ramp signal RV when one level of the input signal VIN and the ramp signal RV changes. However, the CDS circuit 10 may reduce settling time by resetting the output signal VOUT to the level of the reference voltage VTRF during at least one of the first and second reset intervals.

Figure 4:
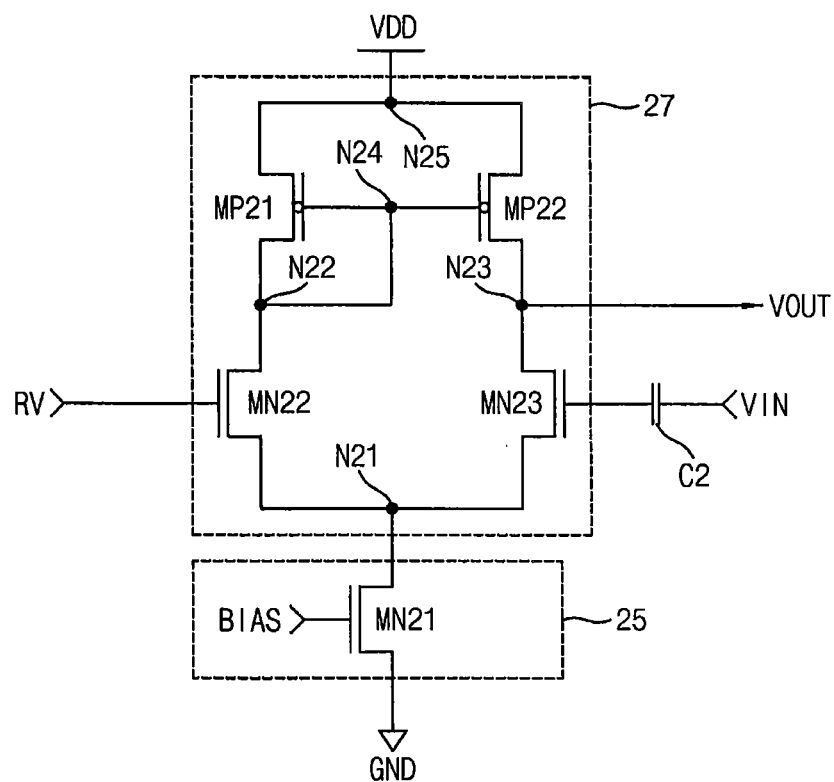
FIG. 4 is a circuit diagram illustrating another example of the comparator in FIG. 2 according to some embodiments.

FIG. 4 is a circuit diagram illustrating another example of the comparator in FIG. 2 according to some embodiments. Referring to FIG. 4, a comparator 21*b* may include a bias unit 25 and a comparison unit 27. The bias unit 25 is connected between the ground voltage VDD and a first node N21 and the comparison unit 27 is connected between the first node N11 and the power supply voltage VDD and compares the input signal VIN and the ramp signal RV to generate the output signal VOUT. The bias unit 25 includes an NMOS transistor MN21 connected between the ground voltage GND and the first node N21 and may adjust an amount of current provided to the comparison unit 27 in response to a bias voltage BIAS which is applied to a gate of the NMOS transistor MN21.

The comparison unit 27 includes MMOS transistors MN22 and MN23 and PMOS transistors MP21 and MP22. The NMOS transistor MN22 is connected between the first node N21 and a second node N22 and has a gate receiving the ramp signal RV. The NMOS transistor MN23 is connected between the first node N21 and a third node N23 in parallel with the NMOS transistor MN22 and has a gate receiving the input signal VIN. The PMOS transistor MP21 is connected between the second node N22 and a fifth node N25 and the PMOS transistor MP22 is connected between the third node N23 and the fifth node N25. The PMOS transistors MP21 and MP22 have a current mirror configuration. Gates of the PMOS transistors MP21 and MP22 are connected to a fourth node N24 and the fourth node N24 is connected to the second node N22. The fifth node N25 is connected to the power supply voltage VDD and the output signal VOUT is provided at the third node N23.

The comparator 21*b* may further include a capacitor that removes DC noise of the input signal VIN. When the comparator 21 in FIG. 2 employs the comparator 21*b* of FIG. 4, the reference voltage VREF may have a level of the ground voltage GND. The ground voltage GND is connected to the first terminal of the reset switch 41 in FIG. 2 and the reset switch 41 provides the ground voltage GND to the output node NO in response to the reset control signal RCS.

Since the comparator 21*b* amplifies difference between the input signal VIN and the ramp signal RV based on the current provided from the bias unit 25 and has limited bandwidth, the comparator 21*b* requires a settling time during which the comparator 21*b* amplifies difference between the input signal VIN and the ramp signal RV when one level of the input signal VIN and the ramp signal RV changes. However, the CDS circuit 10 may reduce settling time by resetting the output signal VOUT to the level of the reference voltage VTRF during at least one of the first and second reset intervals.

Figure 5:
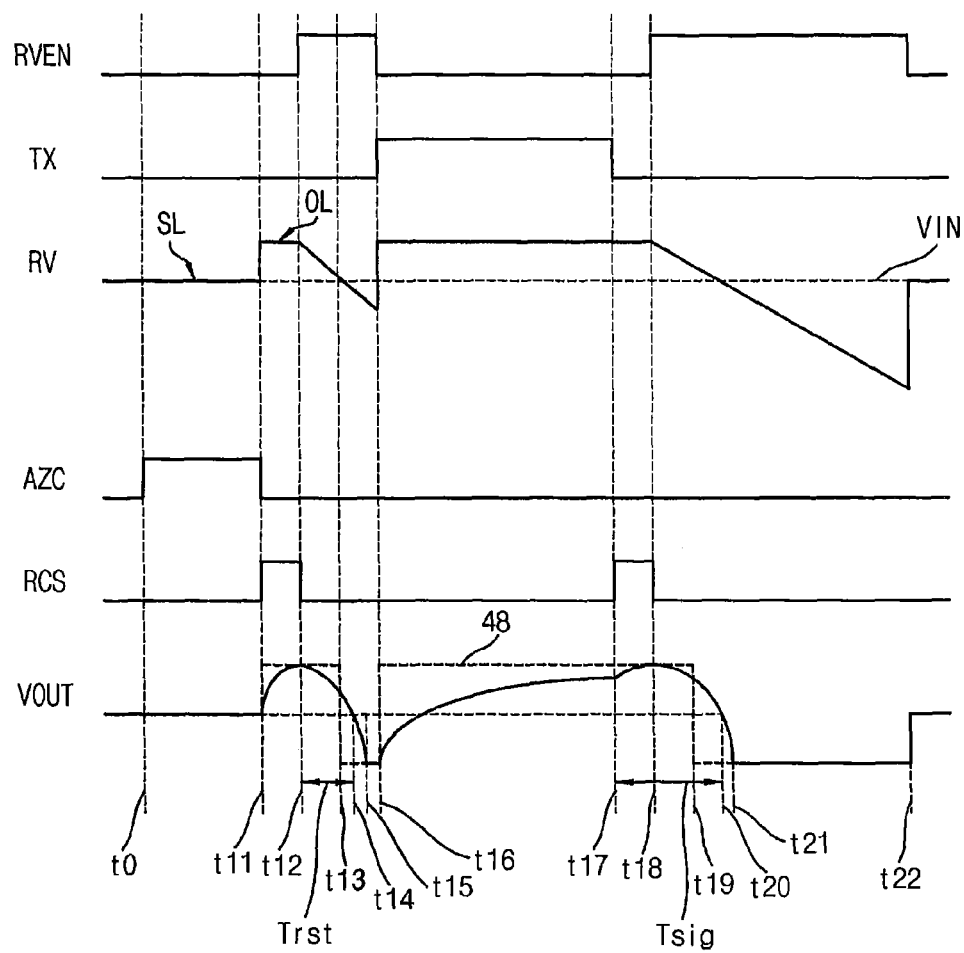
FIG. 5 is a timing diagram illustrating an operation of the CDS circuit of FIG. 2.

FIG. 5 is a timing diagram illustrating an operation of the CDS circuit of FIG. 2. In FIG. 5, it is assumed that the comparator 21 of FIG. 2 employs the comparator 21*a* of FIG. 3. Hereinafter, there will be description on operation of the CDS circuit 10 with reference to FIGS. 2, 3 and 5. FIG. 5 illustrates operation of the CDS circuit 10 in dark situation in which an incident light is not applied to the pixel array.

During an auto-zero interval between times t0-t11, the ramp signal RV has a starting voltage level SL, and the input signal VIN has a same reset level of the output signal VOUT because the first input terminal and the output node NO of the comparator 21 are connected to each other in response to activated auto-zero control signal AZC. The starting voltage level SL may be substantially the same as the reset level.

At time t11, the ramp signal RV has an offset level OL obtained by increasing the starting voltage level SL by a desired offset value. The offset level OL may be greater than the reset level. During a first precharge interval between times t11~t12, the ramp signal RV may have the offset level OL.

During the first precharge interval, the reset control signal RCS is activated, the reset switch 41 is connected in response to the activated reset control signal RCS and the reset switch 41 resets the output node NO to the level of the reference voltage VREF such as the power supply voltage VDD. Since the first precharge interval is substantially same as the activation interval of the reset control signal RCS, the first precharge interval may be substantially the same as the first reset interval. In some embodiments, the first reset interval may be included in the first precharge interval and the first reset interval may not be greater than the first precharge interval. During the first precharge interval, the comparator 21 compares the input signal VIN and the ramp signal RV, amplifies the difference between the input signal YIN and the ramp signal RV and generates the output signal VOUT. The output signal VOUT is reset to the level of the power supply voltage VDD at time t12.

At time t12, a ramp enable signal RVEN is activated, and the ramp signal RV is activated during the first comparison interval between times t12-t15. The ramp enable signal RVEN is applied to a ramp voltage generator 170 in FIG. 8. The ramp voltage generator 170 may provide the ramp signal RV based on the ramp enable signal RVEN. Here, the phrase "a ramp enable signal RVEN is activated" represents the transition of the ramp enable signal RVEN from the first logic level to the second logic level. In addition, the phrase "the ramp signal RV is activated" represents that the ramp signal RV decreases with a desired gradient from the offset level OL.

During the first comparison interval, the comparator 21 performs the first comparison operation on the ramp signal RV and the reset component of the input signal VIN to generate the output signal VOUT. Since the output signal VOUT is reset to the level of the power supply voltage VDD during the first reset interval between times t11~t12, operation speed of the CDS circuit 10 may be increased because starting timing of analog to digital conversion timing Trst on the reset component of the input signal Vin between times t12~t14 is earlier initiated.

At time t16, the ramp enable signal RVEN is deactivated, and the ramp signal RV is deactivated to have the offset level OL during a second precharge interval between times t16~t18. During a transmission interval between time t16~t17, a transmission control signal TX is activated to enable a transmission transistor included in unit pixel of the pixel array, photoelectric conversion signal integrated at a photo diode is diffused to a floating node.

The second precharge interval includes a second reset interval between times t17~t18. During the second reset interval, the reset control signal RCS is activated, the reset switch 41 is connected in response to the activated reset control signal RCS and the reset switch 41 resets the output node NO to the level of the reference voltage VREF such as the power supply voltage VDD. The second reset interval may be substantially same as the first reset interval.

At time t18, the ramp enable signal RVEN is activated, and the ramp signal RV is activated during the second comparison interval between times t18~t22.

During the second comparison interval, the comparator 21 performs the second comparison operation on the ramp signal RV and the image component of the input signal VIN to generate the output signal VOUT. Since the output signal VOUT is reset to the level of the power supply voltage VDD during the second reset interval between times t17~t17, operation speed of the CDS circuit 10 may be increased because starting timing of analog to digital conversion timing Tsig on the image component of the input signal Vin between times t18~t20 is earlier triggered. In addition, since the dark situation is assumed in FIG. 5, the analog to digital conversion timing Trst on the reset component is substantially same as analog to digital conversion timing Tsig on the image component. At time t22, the ramp enable signal RVEN is deactivated.

In FIG. 5, a reference numeral 48 represents an ideal output signal of the comparator 21, and the ideal output signal transitions from high level to low level respectively at times t13 and t19. The ramp enable signal RVEN may be included in a control signal CTL2 in FIG. 8 and the auto-zero control signal AZC and the reset control signal AZC may be included in a control signal CTL3 in FIG. 8.

Figure 6:
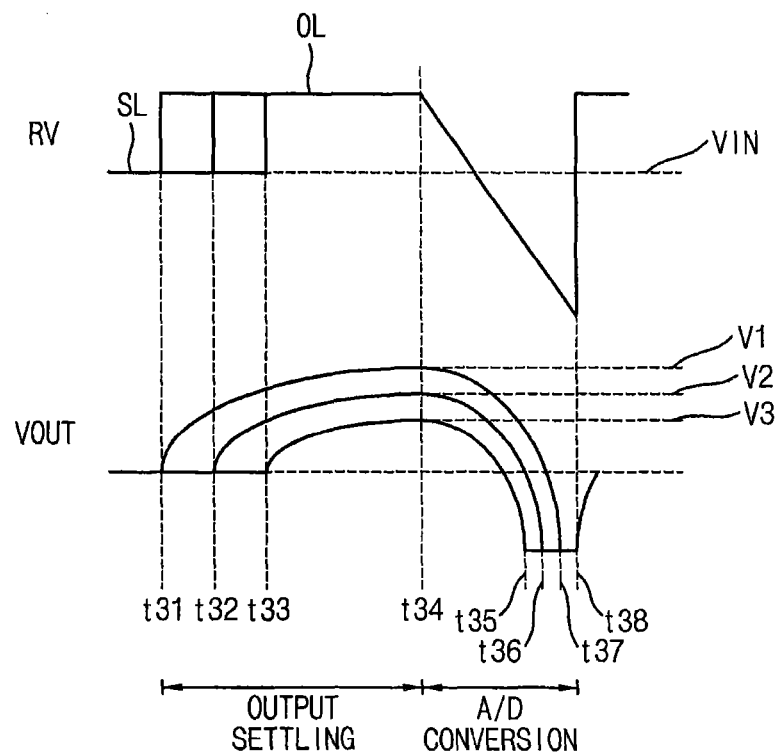
FIG. 6 is a timing diagram illustrating a relationship between transitions of the ramp signal and the output signal in the comparator.

FIG. 6 is a timing diagram illustrating a relationship between transitions of the ramp signal and the output signal in the comparator. FIG. 6 illustrates settling time of the output signal VOUT depending on transitioning time of the ramp signal RV to the offset level OL. Referring to FIG. 6, when the input signal VIN has a constant level and the ramp signal RV transitions from the starting voltage level SL to the offset level OL respectively at times t31, t32 and t33, the output signal VOUT has different levels V1, V2 and V3 respectively at a settling time t34. The settling time t34 is not enough the output of the comparator 21 to be settled and thus the output signal VOUT has different levels V1, V2 and V3 respectively. Since the output signal VOUT has different starting levels V1, V2 and V3 of analog to digital conversion, times required to reach a reference decision point of the analog to digital conversion are different as times t37, t36 and t35 respectively. Although the comparator 21 receives same ramp signal RV and the same input signal VIN, the digital signal obtained from the analog to digital conversion may differ depending on a starting level of the output signal VOUT. For preventing the digital signal obtained from the analog to digital conversion from being different, enough settling time may be given for the output signal VOUT before the analog-digital conversion is initiated, which reduce operating speed of an analog to digital converter. The CDS circuit 10 may greatly reduce the settling time of the output signal VOUT by resetting the starting level of the output signal to the level of the reference voltage VREF before the analog-digital conversion is initiated.

Figure 7:
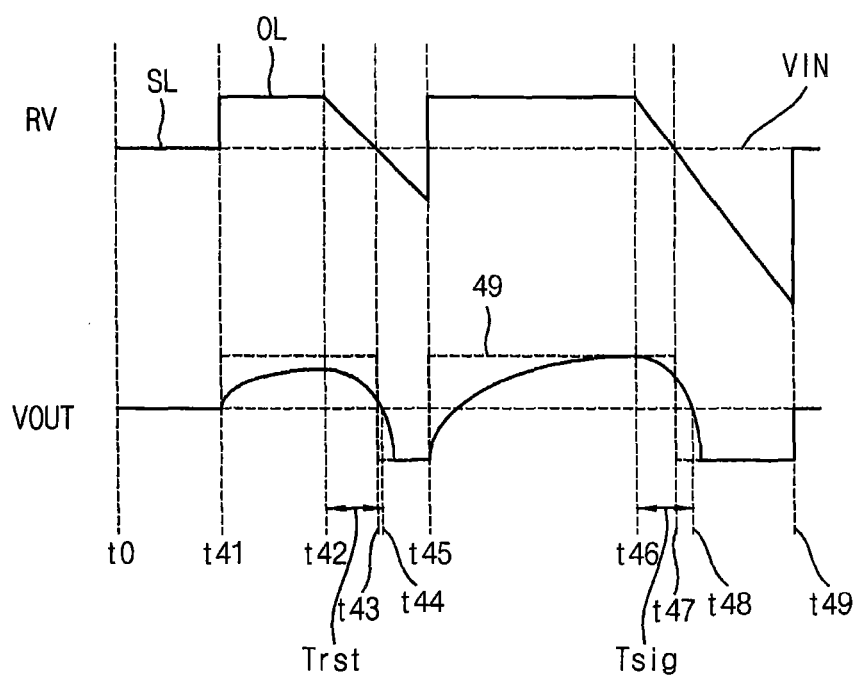
FIG. 7 is a timing diagram of a CDS circuit which does not include the output reset unit in FIG. 2.

FIG. 7 is a timing diagram of a CDS circuit which does not include the output reset unit in FIG. 2. Referring to FIG. 7, during an interval between times to~t41, the ramp signal RV has the starting voltage level SL and the output signal VOUT has the starting voltage level SL. At time t41, the ramp signal RV has an offset level OL obtained by increasing the starting voltage level SL by a desired offset value. The offset level OL may be greater than the reset level. During a first precharge interval between times t11~t12, the ramp signal RV may have the offset level OL. During a first comparison interval between times t42~t45, the ramp signal RV is activated, a comparator performs a first comparison operation on the ramp signal RV and the reset component of the input signal VIN to generate the output signal VOUT. An interval between times t42~t44 corresponds to analog to digital conversion timing Trst on the reset component. During a second precharge interval between times t45~t46, the ramp signal RV is deactivated to have the offset level OL. During a second comparison interval between times t46~t49, the ramp signal RV is activated, the comparator performs a second comparison operation on the ramp signal RV and the image component of the input signal VIN to generate the output signal VOUT. An interval between times t42~t48 corresponds to analog to digital conversion timing Tsig on the image component.

Since the dark situation in which the incident light is not applied to the pixel array is assumed in FIG. 7, the analog to digital conversion timing Trst on the reset component is different from analog to digital conversion timing Tsig on the image component because the starting levels of the first and second comparison operation are different. At time t49, the ramp signal RV has the starting voltage level SL. In FIG. 7, a reference numeral 49 represents an ideal output signal of the comparator, and the ideal output signal transitions from high level to low level respectively at times t43 and t47.

Figure 8:
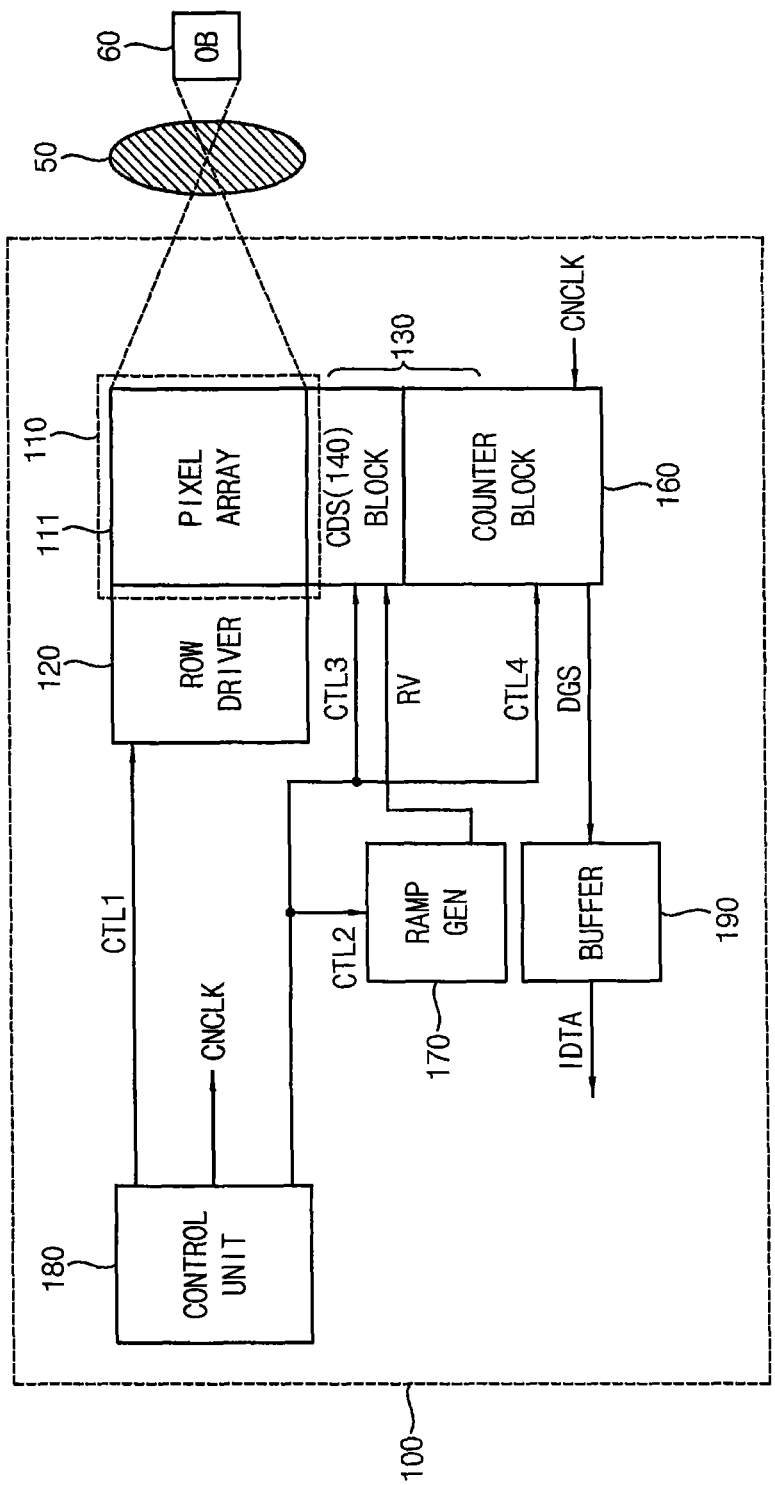
FIG. 8 is a block diagram illustrating an image sensor according to some example embodiments.

FIG. 8 is a block diagram illustrating an image sensor according to some example embodiments. Referring to FIG. 8, an image sensor 100 includes a sensing unit 110 including a pixel array 111, a row driver 115, a CDS block 140, a counter block 160, a ramp signal generator 170, a control unit 180 and a buffer 190. The CDS block 140 and the counter block 160 may constitute an analog-to-digital converter (ADC) 130. The image sensor 100 is controlled in its operation by an image signal processor and may be used to optically sense an object 60 through a lens 50. The image signal processor may provide output data corresponding to the optically sensed object 60. Such output data may then be communicated to a display unit that is capable of visually representing a display image in the likeness of the object 60. The display unit may include a computer, mobile phone and the like.

The image signal processor may receive image data provided (e.g.) from the buffer 190 of the image sensor 100 and performs certain data processing functions on the image data to improve the quality or define the properties of the image ultimately displayed by the display unit. The image signal processor or may be disposed external to the image sensor 100 or may be disposed internal to the image sensor 100.

The pixel array 111 includes a plurality of photo sensitive devices such as photo diodes or pinned photo diodes. The pixel array 111 senses some defined portion of the electromagnetic spectrum (hereafter, generically referred to as "light" recognizing that this term may include visible and not visible (e.g., infrared) components of the electromagnetic spectrum). The photo sensitive devices detect and convert the light into corresponding analog signal(s) (hereafter, collectively and singularly referred to as "an image signal").

The control unit 180 may be used to provide control signals CLT1~CLT4 to the row driver 115, the ramp signal generator 170, the CDS block 130 and the counter block 160 to control their respective and interrelated operation(s). The control unit 180 may be generate first and second input clock signals SCLK and FCLK to the counter block 160.

The row driver 115 drives the pixel array 111 in row-wise units. For example, the row driver 115 may generate a row selection signal such as the control signal CTL1. In response to the row selection signal, the pixel array 111 provides the CDS block 140 with a first analog signal corresponding to the reset component and a second analog signal corresponding to the image component. The CDS block 140 performs a CDS operation on the first and second analog signals. The CDS block 140 includes a plurality of CDS circuits, each connected to each of a plurality of column lines, and each of CDS circuit resets the output signal to the level of the reference voltage in response to a reset control signal which is activated during at least one of a first reset interval preceding a first comparison interval in which a first comparison operation is performed on the ramp signal RV and the reset component and a second reset interval preceding a second comparison interval in which a second comparison operation is performed on the ramp signal RV and the image component to perform CDS operation more rapidly. The CDS block 140 performs the CDS operation in response to the control signal CTL3 and the control signal CTL3 may include the auto-zero control signal AZC and the reset control signal RCS.

The counter block 160 may include a plurality of counters, each connected to each of the CDS circuits and each counter may count an input clock signal CNCLK based on the output signal from the CDS circuit to generate a digital signal DGS.

The buffer 190 temporarily stores the digital signal DGS from the counter block 160 and may perform sense and amplification operations on the digital signal DGS to generate corresponding image data IDTA to be output. Thus, in some embodiments, the buffer 190 may include a plurality of column memory blocks (e.g., static random access memories (SRAMs)) provided to store respective groupings (e.g., columns) of count result data, and a sense amplifier provided to sense and amplify the digital count result data provided by the counter block 160.

Figure 9:
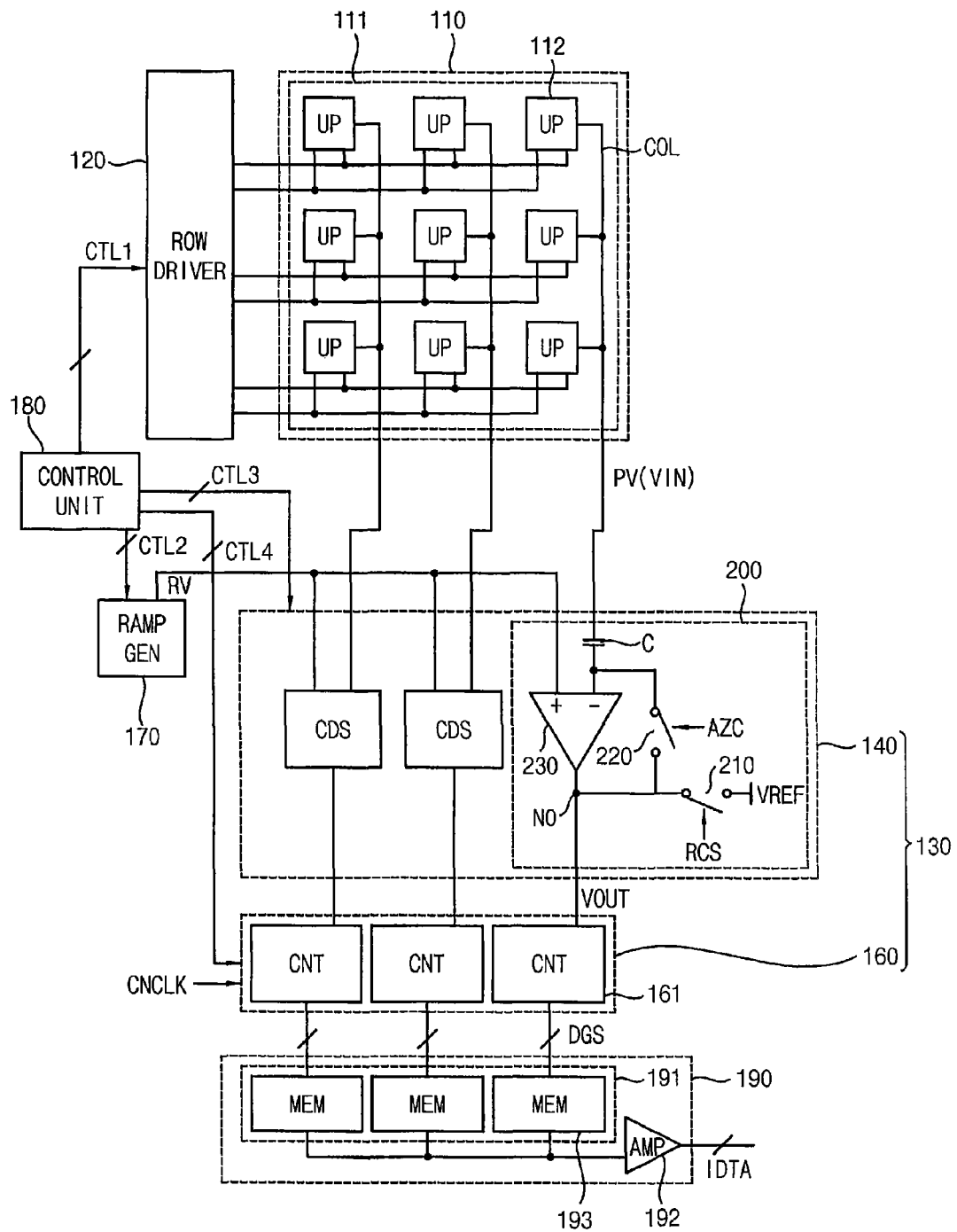
FIG. 9 further illustrates the image sensor of FIG. 8 according to some example embodiments.

FIG. 9 further illustrates the image sensor of FIG. 8 according to some example embodiments. Referring to FIG. 9, the image sensor 100 includes as before, the sensing unit 110 including the pixel array 111, the row driver 115, the CDS block 140, the counter block 160, the ramp signal generator 170, the control unit 180 and the buffer 190. The CDS block 140 and the counter block 160 may constitute the ADC 130.

The pixel array 111 may include a plurality of unit pixels 112 arranged in a matrix. Various sub-sets of unit the pixels 112 are connected in respective rows and columns among a plurality of row and a plurality of column. The unit pixels 112 may include red pixels that convert light in the defined red spectrum into a corresponding electrical signal, green pixels that convert light in a defined green spectrum into a corresponding electrical signal, and a blue pixel that converts light in a defined blue spectrum into a corresponding electrical signal. In some embodiments, one or more color filter(s) may be included in relation to individual unit pixels 111 in order to filter incident light according to a particular spectrum.

The row driver 120 may be configured to receive and decode a row control signal CTL1 (e.g., an address signal) provided by (or through) the control unit 180, and select at least one row line among the row lines in the pixel array 111 in response to a decoded row control signal.

The CDS block 140 may be configured to perform CDS on respective pixel output voltage PV (or input signal YIN) provided by individual unit pixels 112 connected (e.g.) to one of the column lines COL in the pixel array 111. The CDS block 140 includes a plurality of CDS circuits 200, each connected to each of a plurality of column lines COL, and each of CDS circuit 200 resets the output signal VOUT to the level of the reference voltage VREF in response to the reset control signal RCS which is activated during at least one of the first reset interval preceding the first comparison interval in which the first comparison operation is performed on the ramp signal RV and the reset component and the second reset interval preceding the second comparison interval in which the second comparison operation is performed on the ramp signal RV and the image component to perform CDS operation more rapidly.

Each of the CDS circuits 200 includes a sampling unit that includes a comparator 230, an output reset unit that includes a reset switch 210 and an auto-zero switch 220. The comparator 230 performs CDS operation on the reset component and the image component of the input signal VIN based on the ramp signal RV to generate the output signal VOUT. The reset switch 210 connects an output node NO of the comparator 230 to the reference voltage VREF to reset the output signal VOUT in response to the reset control signal RCS which is activated during at least one of the first and second reset intervals. The auto-zero switch 220 connects a first input terminal to the output node NO of the comparator 230 during an auto-zero interval preceding the first precharge interval in response to the auto-zero control signal AZC. The capacitor C removes DC noise of the input signal VIN.

The counter block 160 includes a plurality of counters 161, and each of the counters 161 is connected to the output terminal (output node NO) of the comparator 230. Each of the counters 161 counts the input clock signal CNCLK provided from the control unit 180 based on the output signal VOUT to provide a digital signal DGS.

Each counter 161 may be an up/down counter or a bit-wise inversion counter. The bit-wise inversion counter may perform a similar operation to that of the up/down counter. For instance, the bit-wise inversion counter performs up-counting and bit inversion to effectively implement a 1's complement approach to counting. In this manner, the bit-wise inversion counter may perform reset counting and invert a result of the reset counting, such that the result is converted into a 1's complement form, (i.e., a negative value).

The buffer 190 includes a column memory block 191 and a sense amplifier 192. The column memory block 191 includes a plurality of individual memories 193. The plurality of memories 193 respectively operate in response to a memory control signal provided by a memory controller (not shown), may be disposed within the column memory block 191 (or within the control unit 180) and may operate in response to control signal provided by the control unit 180. In some embodiments, each individual memory 193 may be an SRAM.

In response to the memory control signal, the column memory block 191 may be used to temporarily store the digital signals DGS provided from the counters 161 and then outputs an amplified version of same via the sense amplifier 192 as the digital data IDTA or the image signal.

Figure 10:
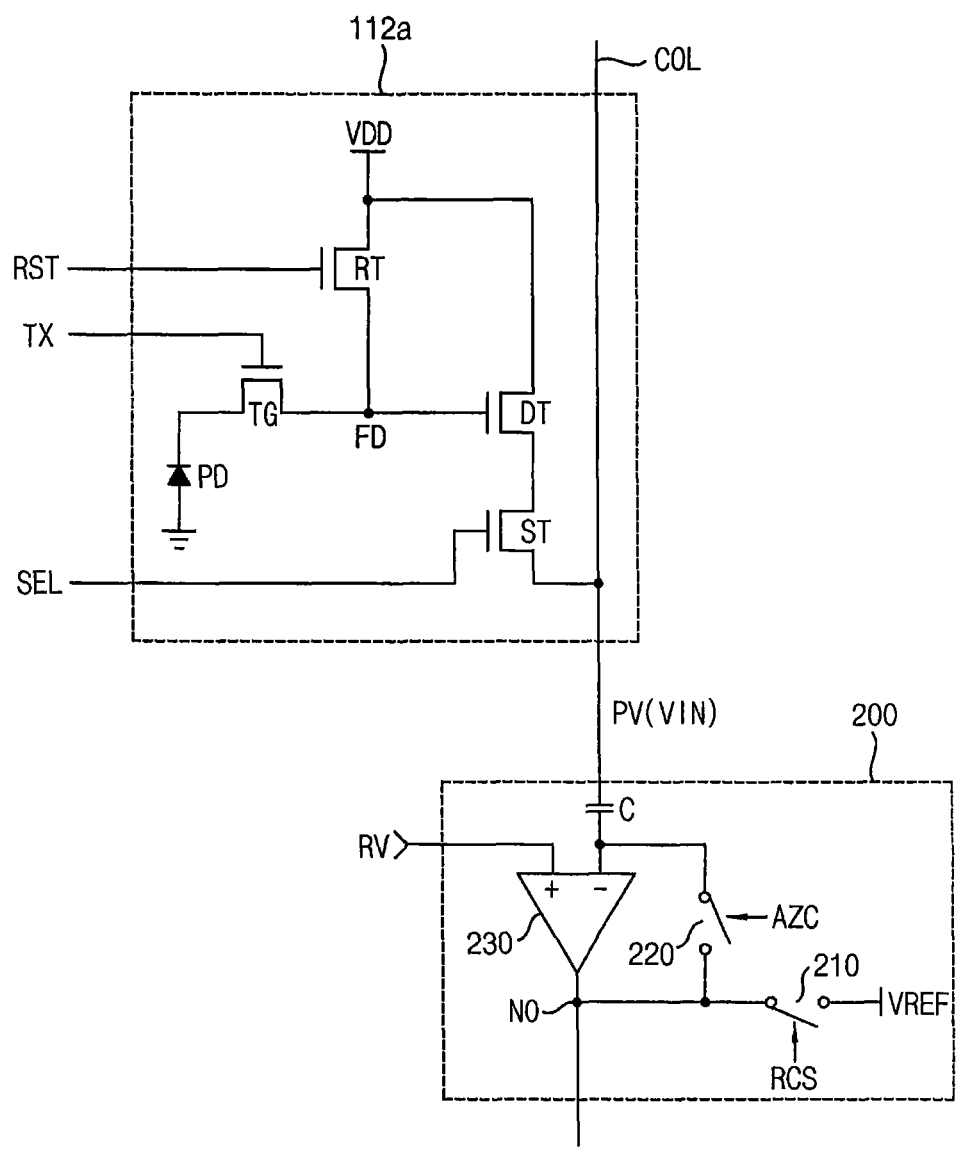
FIG. 10 illustrates connection relationship between one unit pixel in the pixel array and one CDS circuit in the image sensor of FIG. 9.

FIG. 10 illustrates connection relationship between one unit pixel in the pixel array and one CDS circuit in the image sensor of FIG. 9. Referring to FIG. 10, a unit pixel 112a includes a photo sensitive device PD, a transfer transistor TG, a floating diffusion node FD, a reset transistor RT, a drive transistor DT, and a select transistor ST.

The unit pixel 112a includes the photo sensitive device PD, the transfer transistor TG including a gate controlled by a transfer gate control signal TX to transfer a photoelectric conversion signal integrated at the photo sensitive device PD, a floating diffusion node FD storing the photoelectric conversion signal transferred through the transfer transistor TG or a reset signal, e.g., VDD transferred through a reset transistor RT including a gate controlled by a reset control signal RX, a drive transistor DT outputting a voltage of the floating diffusion node FD through a source using a source follower structure, and a select transistor ST which is turned on according to a predetermined timing to output a signal generated by the unit cell 112a in response to a column selection signal SEL.

The photo sensitive device PD may include at least one among a photodiode, a photo transistor, a photo gate, a pinned photodiode (PPD), and a combination thereof.

Figure 12:
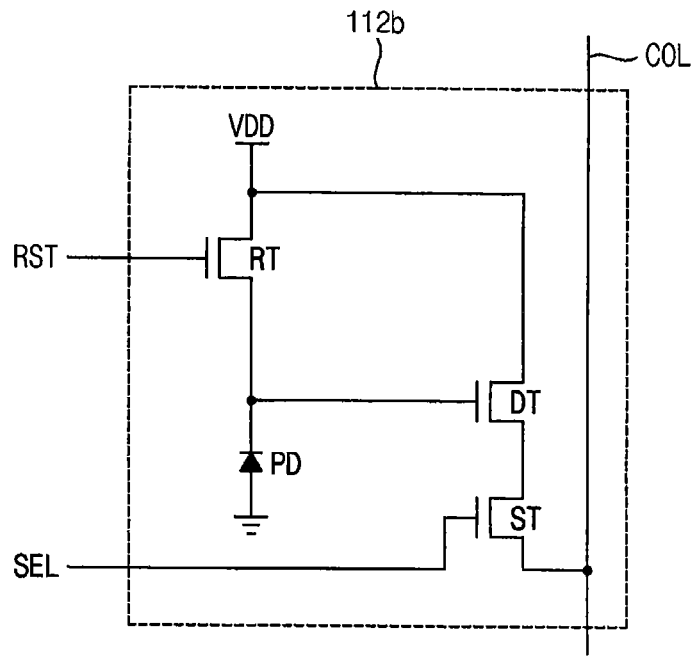
FIGS. 12 through 14 are circuit diagrams of examples of a unit pixel, which may be included in the pixel array in FIG. 9 according to example embodiments.
Figure 13:
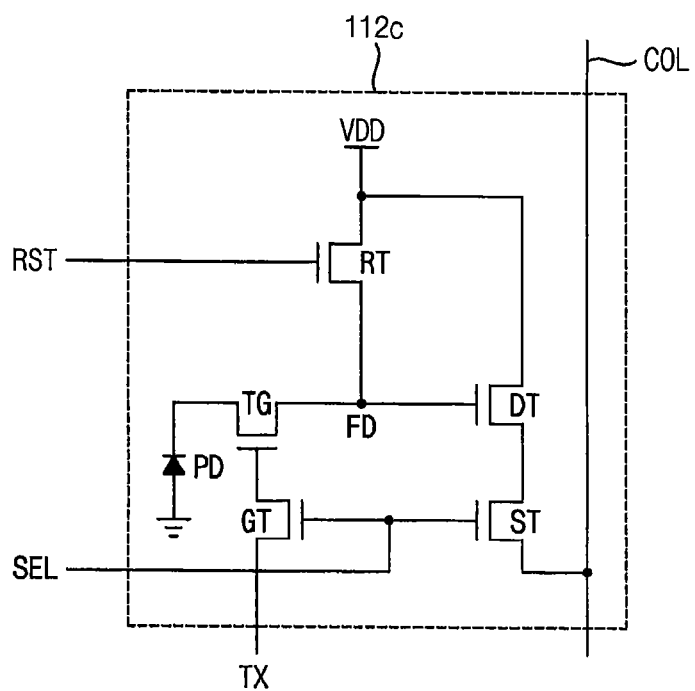
Figure 14:
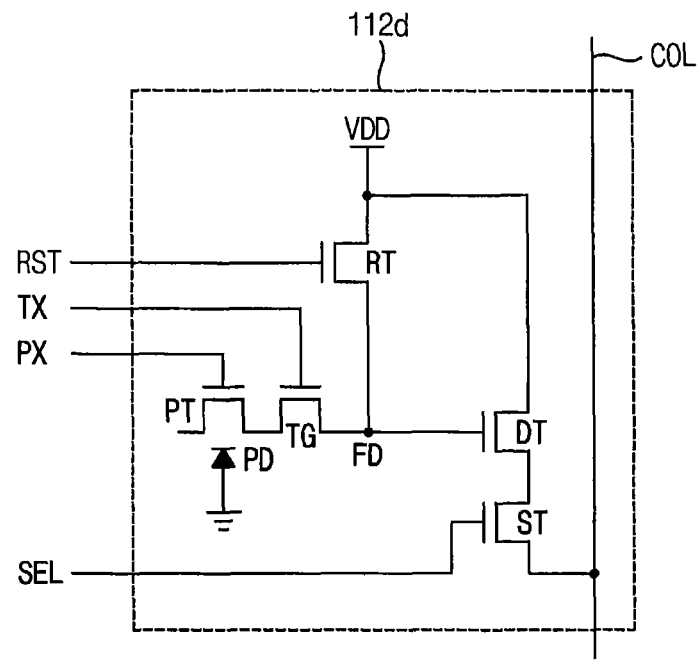

FIG. 10 illustrates a unit pixel having the 4T structure, which includes the single photo sensitive device PD and the four MOS transistors TG, RT, DT, and ST, but the present invention is not restricted to the current embodiments. Embodiments of the present invention can be applied to any circuit including the photo sensitive device PD and at least three transistors including the drive transistor DT and the select transistor ST. Pixels according to different embodiments of the present invention are illustrated in FIGS. 12 through 14.

The CDS circuit 200 includes the sampling unit that includes the comparator 230, the output reset unit that includes the reset switch 210, the auto-zero switch 220 and the capacitor C. The comparator 230 performs CDS operation on the reset component and the image component of the input signal VIN based on the ramp signal RV to generate the output signal VOUT. The reset switch 210 connects an output node NO of the comparator 230 to the reference voltage VREF to reset the output signal VOUT in response to the reset control signal RCS which is activated during at least one of the first and second reset intervals. The auto-zero switch 220 connects a first input terminal to the output node NO of the comparator 230 during an auto-zero interval preceding the first precharge interval in response to the auto-zero control signal AZC. The capacitor C removes DC noise of the input signal VIN.

As described above, the CDS circuit 200 resets the output signal VOUT to the level of the reference voltage VREF in response to the reset control signal RCS which is activated during at least one of the first reset interval preceding the first comparison interval in which the first comparison operation is performed on the ramp signal RV and the reset component and the second reset interval preceding the second comparison interval in which the second comparison operation is performed on the ramp signal RV and the image component to perform CDS operation more rapidly.

Figure 11:
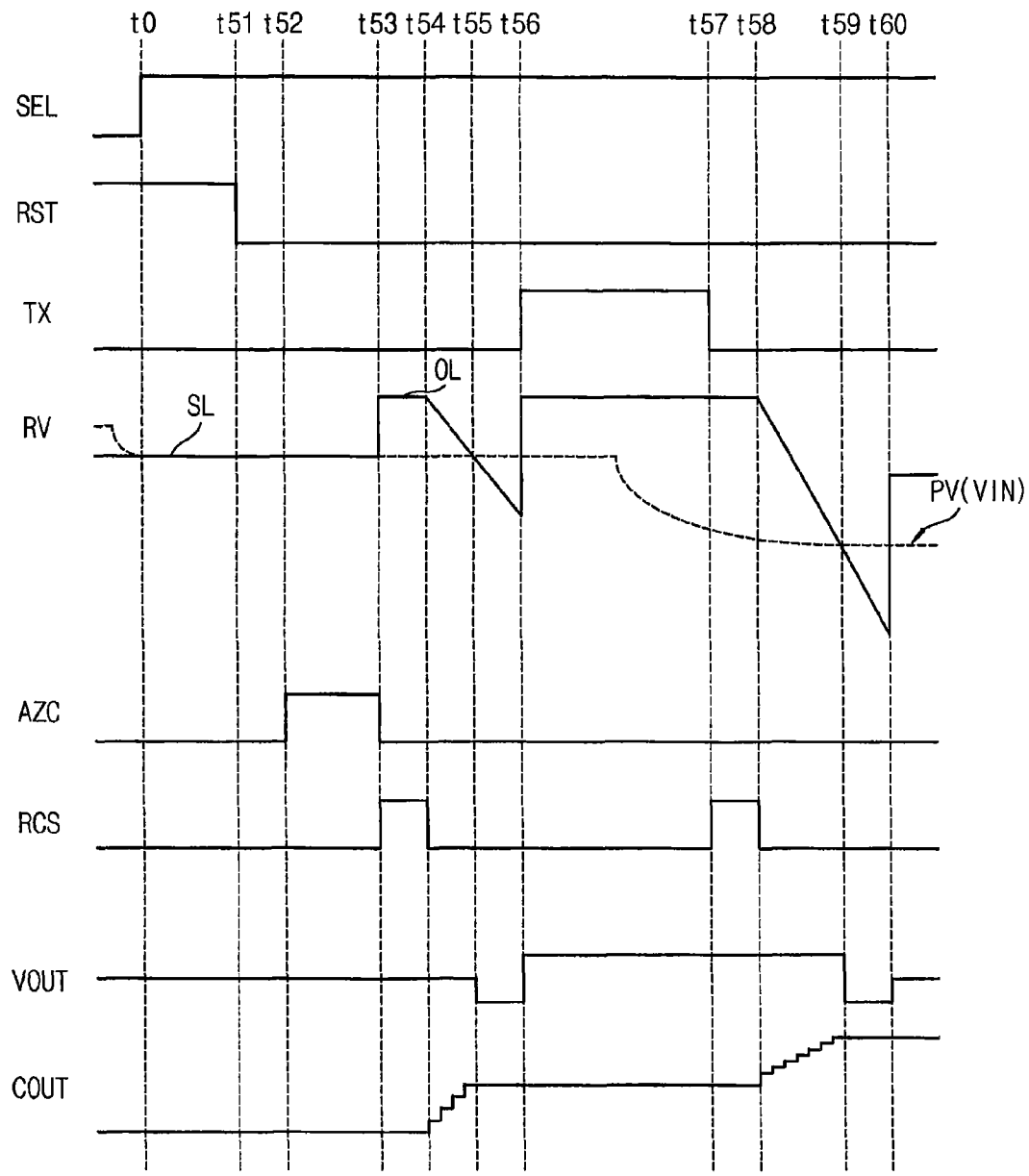
FIG. 11 is a timing diagram illustrating operation of the image sensor of FIG. 9.

FIG. 11 is a timing diagram illustrating operation of the image sensor of FIG. 9. In FIG. 11, it is assumed that the unit pixel 112 employs the unit pixel 112a of FIG. 10. Referring to FIGS. 9 through 11, at time t0, the column selection signal SEL applied to the selection transistor ST is activated and the reset signal RST is deactivated at time t51. During an auto-zero interval between times t52-t53, the ramp signal RV has a starting voltage level SL, and the input signal VIN has a same reset level of the output signal VOUT because the first input terminal and the output node NO of the comparator 230 are connected to each other in response to activated auto-zero control signal AZC. The starting voltage level SL may be substantially the same as the reset level.

At time t53, the ramp signal RV has an offset level OL obtained by increasing the starting voltage level SL by a desired offset value. The offset level OL may be greater than the reset level. During a first precharge interval between times t53~t54, the ramp signal RV may have the offset level OL.

During the first precharge interval, the reset control signal RCS is activated, the reset switch 210 is connected in response to the activated reset control signal RCS and the reset switch 210 resets the output node NO to the level of the reference voltage VREF. Since the first precharge interval is substantially same as the activation interval of the reset control signal RCS, the first precharge interval may be substantially the same as the first reset interval. In some embodiments, the first reset interval may be included in the first precharge interval and the first reset interval may not be greater than the first precharge interval. The output signal VOUT is reset to the level of the power supply voltage VDD at time t54.

The ramp signal RV is activated during the first comparison interval between times t54~t56. Here, the sentence "the ramp signal RV is activated" represents that the ramp signal RV decreases with a desired gradient from the offset level OL. During the first comparison interval, the comparator 230 performs the first comparison operation on the ramp signal RV and the reset component of the input signal VIN to generate the output signal VOUT. During an interval between times t54~t55 in which the ramp signal RV is greater than the input signal VIN, the counter 161 counts the input clock signal CNCLK to generate digital signals DGS with respect to the reset component. Since the output signal VOUT is reset to the level of the power supply voltage VDD during the first reset interval between times t53~t54, operation speed of the ADC 130 may be increased because starting timing of analog to digital conversion timing on the reset component between times t54~t55 is earlier initiated.

The ramp signal RV is deactivated to have the offset level OL during a second pracharge interval between times t56~t58. During a transmission interval between time t56~t57, the transmission control signal TX is activated to enable a transmission transistor TG, photoelectric conversion signal integrated at the photo diode PD is diffused to a floating node FD.

The second precharge interval includes a second reset interval between times t57~t58. During the second reset interval, the reset control signal RCS is activated, the reset switch 210 is connected in response to the activated reset control signal RCS and the reset switch 210 resets the output node NO to the level of the reference voltage VREF such as the power supply voltage VDD.

During a second comparison interval between times t58~t60, the ramp signal RV is activated. During the second comparison interval, the comparator 230 performs the second comparison operation on the ramp signal RV and the image component of the input signal VIN to generate the output signal VOUT. During an interval between times t58~t59 in which the ramp signal RV is greater than the input signal VIN, the counter 161 counts the input clock signal CNCLK to generate the digital signals DGS with respect to the image component. Since the output signal VOUT is reset to the level of the power supply voltage VDD during the second reset interval between times t57~t58, operation speed of the ADC 130 may be increased because starting timing of analog to digital conversion timing on the signal component between times t589~t60 is earlier initiated. The ramp signal RV has the starting voltage level SL at time t60.

Thus, as illustrated by FIGS. 1-4 and 9, an integrated circuit device (e.g., image sensor) according to embodiments of the invention includes a sampling circuit 20, 200, which is responsive to a ramp signal (RV) and an input signal (VIN) provided by an image-sensor pixel array 111. According to some embodiments of the invention, the sampling circuit is configured to perform a correlated double sampling (CDS) operation on a reset component of the input signal and an image component of the input signal. The integrated circuit also includes a reset circuit 40, which is configured to reset an output signal (VOUT) generated by the sampling circuit to a first level in response to a reset control signal (RCS). As illustrated by FIGS. 5 and 11, this reset control signal RCS is active during at least one of a first reset interval and a second reset interval. The first reset interval precedes a first comparison interval during which a first comparison operation is performed on the ramp signal and the reset component. The second reset interval precedes a second comparison interval during which a second comparison operation is performed on the ramp signal and the image component.

According to aspects of these embodiments of the invention, the first level is equivalent to a level of a reference voltage (VREF) provided to the reset circuit, which includes a reset switch (41, 210) that passes the reference voltage to an output node of the sampling circuit during at least one of the first reset interval and the second reset interval. The sampling circuit may include a comparator 21, 230 configured to generate the output signal at the output node in response to comparing the ramp signal to the input signal. As illustrated by FIGS. 3-4, the comparator may include a differential amplifier having a first input responsive to the ramp signal and a second input responsive to the input signal. A node of the differential amplifier may be electrically connected to a pull-up bias circuit 22 as shown by FIG. 3, or a pull-down bias circuit 25 as shown by FIG. 4.

According to still further embodiments of the invention, an auto-zero switch 43, 220 is provided, which is configured to connect an output node of the sampling circuit to an input node of the sampling circuit in response to an auto-zero control signal (AZC), which is active during an auto-zero time interval, which precedes the first comparison interval. As further shown by FIGS. 3-4 and 9, the input signal (VIN) may be provided to a node that is capacitively coupled (e.g., by C1, C2, C) to the second input of the comparator. A digital signal generation circuit (e.g., counter 160) may also be provided, which is configured to perform a digital conversion operation on the output signal.

FIGS. 12 through 14 are circuit diagrams of examples of unit pixel which may be included in the pixel array in FIG. 9 according to example embodiments. A unit pixel 112b illustrated in FIG. 12 has a three transistor (3T) structure and includes a photo sensitive device PD, a reset transistor RT, a drive transistor (or a source follower transistor) DT, and a select transistor ST. A unit pixel 112c illustrated in FIG. 13 has a five transistor (5T) structure and includes one transistor GT in addition to the photo sensitive device PD, the transfer transistor TX, the reset transistor RT, the drive transistor (or the source follower transistor) DT, and the select transistor ST. A unit pixel 111d illustrated in FIG. 14 has the 5T structure and includes two more transistors PT and TG in addition to the photo sensitive device PD, the reset transistor RT, the drive transistor (or the source follower transistor) DT, and the select transistor ST. Various types of pixel cells as shown in FIGS. 11, 12 through 14 may have an independent structure, as described above, or may share at least one element with each other. For instance, in the structure illustrated in FIG. 11, two or four pixels may include only the photo sensitive device PD and the transfer transistor TG independently, and share the other elements with one another and independently operate through timing control.

Figure 15:
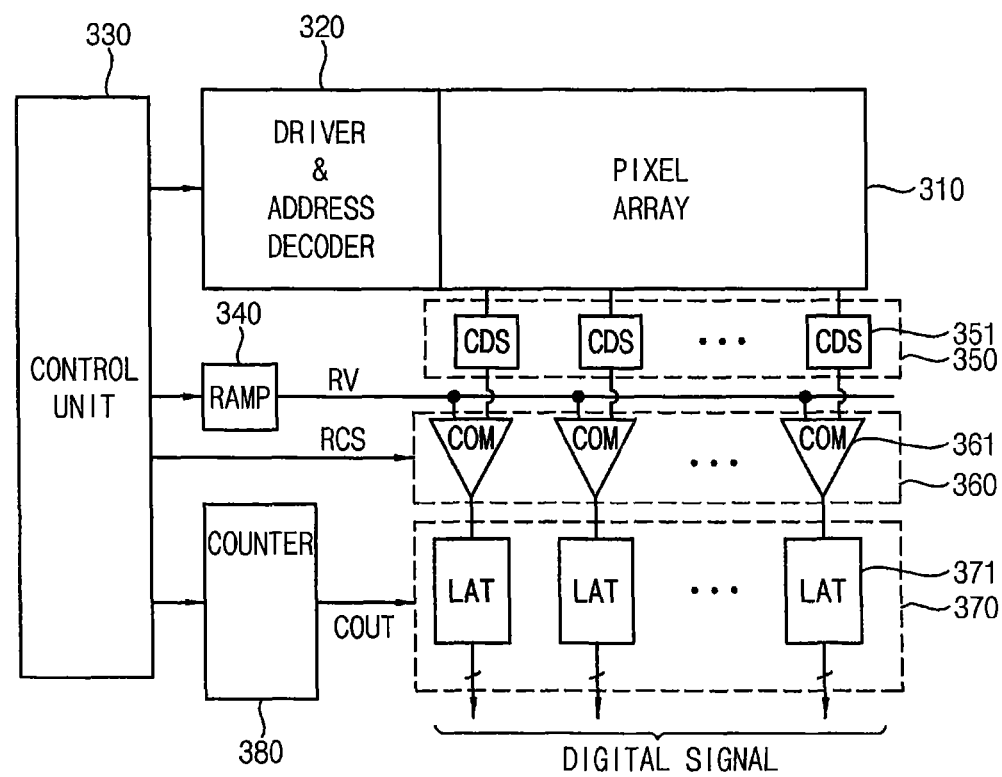
FIG. 15 is a block diagram illustrating an example of an image sensor according to some example embodiments.

FIG. 15 is a block diagram illustrating an example of an image sensor according to some example embodiments. Referring to FIG. 15, an image sensor 300 includes a pixel array 310, a driver/address decoder 320, a control unit 330, a ramp signal generator 340, a CDS block 350, a comparator block 360, a latch unit 370 and a global counter 380.

The pixel array 310 includes a plurality of unit pixels that are arranged in a matrix form. Each unit pixel may convert an incident light into an electrical analog signal (e.g., analog pixel signal). When the image sensor includes unit pixels referred to as active pixels or gain cells, respective signal from each unit pixel is detected by an address control of the unit pixels. The active pixel sensor may be a kind of address-controlled image sensor, and the driver/address decoder 320 may control operation of the pixel array 310 by unit of a column and/or a row. The control unit 330 may generate control signals for controlling operations of the other components of the image sensor 300.

The analog signals detected by the pixel array 310 may be converted into digital signals by analog-to-digital converter including the comparator block 350, the latch unit 370 and the global counter 380. The analog signals are generally output column by column. Thus the CDS block 350, the comparator block 360 and the latch unit 370 include a plurality of CDS circuits 351, a plurality of comparators 361 and a plurality of latches 371 corresponding to the columns of the pixel array 310.

The analog signals output from the pixel array 310 include a respective reset component and a respective measured image component for each pixel. The respective reset component may represent respective fixed pattern noise (FPN) for the pixel and a respective logic circuit of the pixel. The respective measured image component may be generated from the pixel sensing incident light. A final image signal representing the intensity of incident light at each pixel may be indicated by a subtraction of the respective reset component from the respective measured image component. Such a final image signal is generated from the CDS procedure.

The CDS block 350 may perform analog double sampling (ADS) by generating a difference between the reset component and the measured image component using capacitors and switches. The CDS block 350 may generate analog signals, each being a respective final image component representing such a difference for each column. The comparator block 360 may compare the analog voltages for the columns of pixel from the CDS block 350 with the ramp signal RV from the ramp signal generator 340 to generate respective comparison signals for the columns. Each comparison signal may have a respective transition time point that represents the level of the respective analog image signal. The comparator block 360 receives the reset control signal RCS and resets the output voltage to the level of the reference voltage before a comparison operation is performed on valid image component.

The counter output signal COUT from the global counter 380 is commonly applied to the latches 371 and each latch 371 may latch the counter output signal COUT from the counter 380 at the respective transition time point of the respective comparison signal to generate a respective latched digital signal of the respective final image signal for the respective column.

Figure 16:
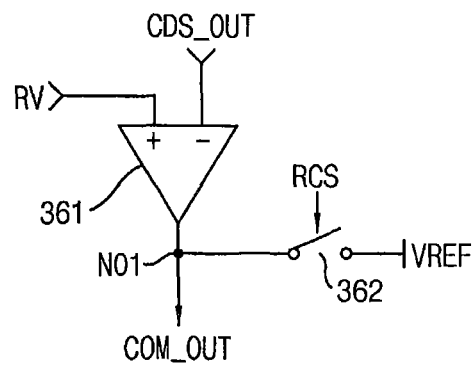
FIG. 16 illustrates one comparator in the comparator block in FIG. 15.

FIG. 16 illustrates one comparator in the comparator block in FIG. 15. Referring to FIG. 16, the comparator 361 has a first (negative) input terminal receiving an output CDS_OUT of the CDS circuit 351 and a second (positive) input terminal receiving the ramp signal RV. The comparator 361 provides an output signal COM_OUT at an output node NO1, the reset switch 362 selectively connects the output node NO1 to the reference voltage VREF in response to the reset control signal RCS to reset the output signal COM_OUT to the level of the reference voltage VREF.

Figure 17:
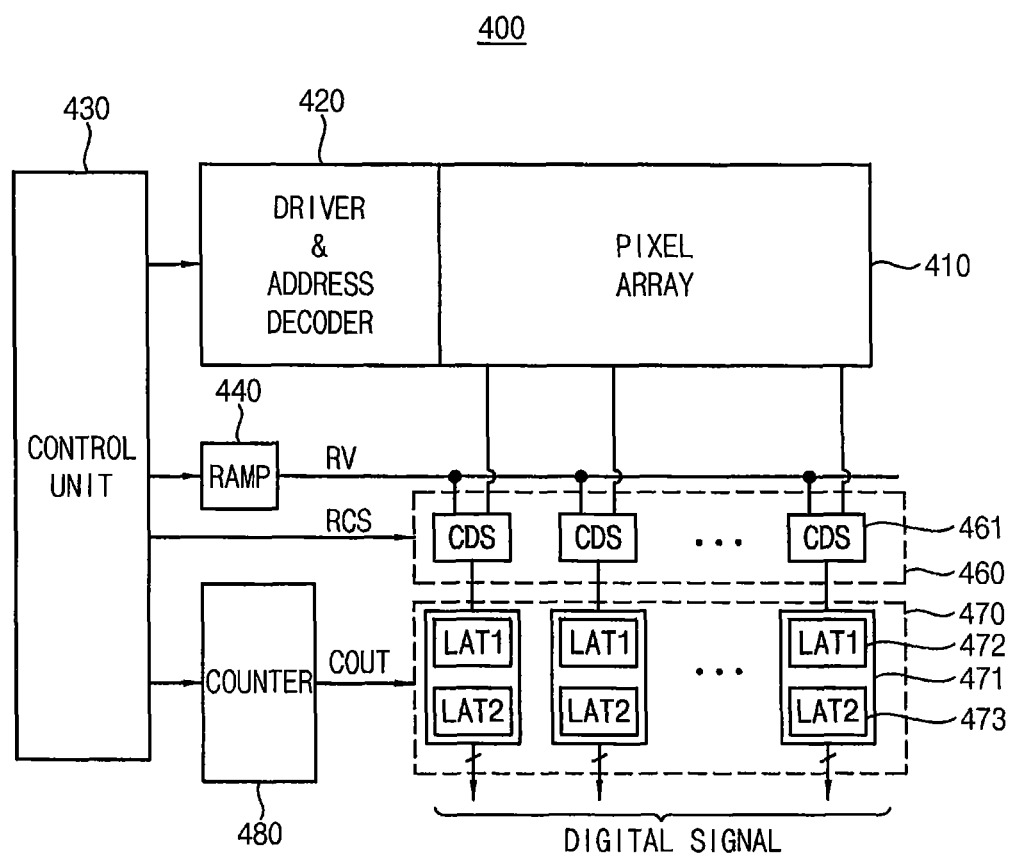
FIG. 17 is a block diagram illustrating another example of an image sensor according to some example embodiments.

FIG. 17 is a block diagram illustrating another example of an image sensor according to some example embodiments. Referring to FIG. 17, an image sensor 400 includes a pixel array 410, a driver/address decoder 420, a control circuit 430, a ramp signal generator 440, a CDS block 460, a latch unit 470 and a global counter 480.

The active pixel sensor may be a kind of address-controlled image sensor, and the driver/address decoder 420 may control operation of the pixel array 310 by unit of a column and/or a row. The control unit 430 may generate control signals for controlling operations of the other components of the image sensor 400.

In the image sensor 400 of FIG. 17, the latch unit 470 includes a plurality of latch circuit 471 for a column may include a respective first latch 472 and a respective second latch 473. The pixel array 410 may generate a first analog voltage representing a respective reset component and a second analog voltage representing a respective measured image component for each column. In a first sampling, the CDS block 460 compares the first analog voltage with the ramp signal RV provided from the ramp signal generator 440 to generate a respective comparison signal having a transition time point corresponding to the level of the reset component. A counter output signal COUT from the global counter 480 is commonly provided to all of the latch circuits 471. The respective first latch 472 may latch the counter output signal COUT at the transition time point of the respective comparison signal to store digital signal with respect to the reset component in the respective first latch 472.

In a second sampling, the CDS block 460 compares the second analog voltage with the ramp signal RV provided from the ramp signal generator 440 to generate a respective comparison signal having a transition time point corresponding to the level of the image component. The respective second latch 473 may latch the counter output signal COUT at the transition time point of the respective comparison signal to store digital signal with respect to the image component in the respective second latch 473. Such digital values latched by the first and second latches 472 and 473 during the first and second samplings may be provided to internal logic circuits that determine a difference of such digital values to determine the final image component in digital form for digital double sampling in the image sensor 400.

Each CDS circuit 461 in the CDS block 460 may employ the CDS circuit 10 of FIG. 2. Therefore, each CDS circuit 461 resets the output signal of the comparator to the level of the reference voltage VREF in response to the reset control signal RCS which is activated during at least one of the first reset interval preceding the first comparison interval in which the first comparison operation is performed on the ramp signal RV and the reset component and the second reset interval preceding the second comparison interval in which the second comparison operation is performed on the ramp signal RV and the image component. Therefore, settling time of the comparator may be reduced to increase operating speed of an ADC including the CDS circuit 461.

Figure 18:
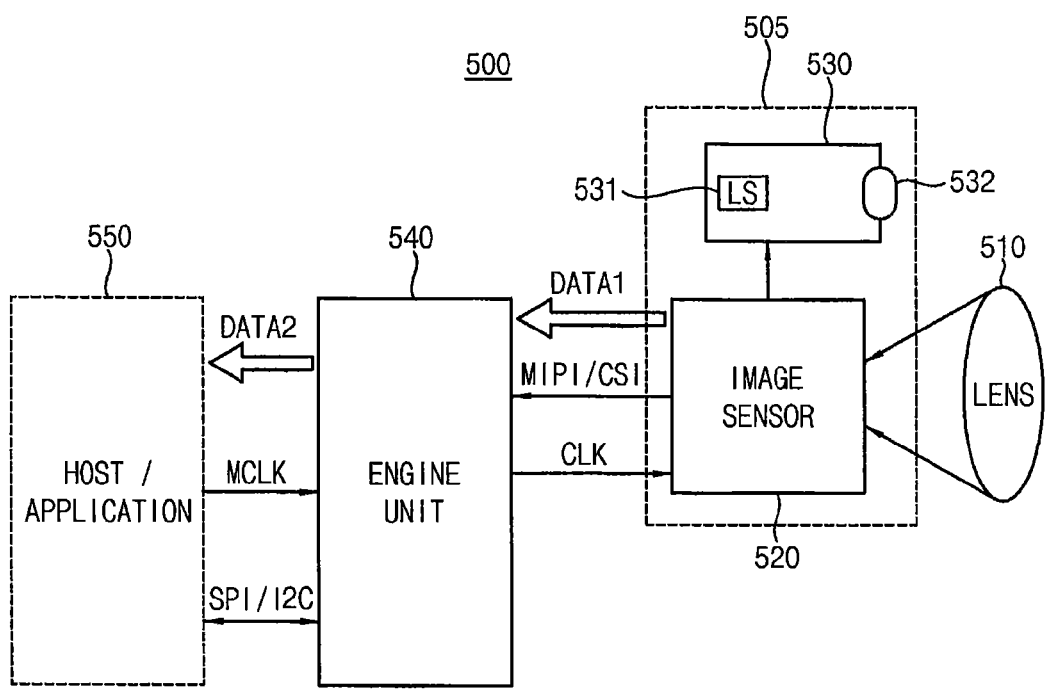
FIG. 18 is a block diagram illustrating an example of a camera including the image sensor according to some example embodiments.

FIG. 18 is a block diagram illustrating an example of a camera including the image sensor according to some example embodiments. Referring to FIG. 18, a camera (also referred to as an image pick-up device) 500 includes a receiving lens 510, an image sensor chip 505 and an engine unit 540. The image sensor chip 505 may include an image sensor 520 and a light source module 530. In some embodiments, the image sensor 520 and the light source module 530 may be implemented as separate devices, or may be implemented such that at least one component of the light source module 530 is included in the image sensor 520. The light source module 530 may include a light source 531 and a lens 532. The image sensor 520 may employ the image sensor 100 of FIG. 9 and may include a sensing unit that employs a pixel array, a row driver, a CDS block, a counter block, a ramp signal generator, a control unit and a buffer. The image sensor 520 may employ the image sensor 300 of FIG. 15 or the image sensor 400 of FIG. 17.

The CDS block may include a plurality of CDS circuits as illustrated in FIG. 2 and each CDS circuit may include a sampling unit that employs a comparator and an output reset unit that employs a reset switch. Therefore, the image sensor 520 resets the output signal of the comparator to the level of the reference voltage in response to the reset control signal which is activated during at least one of the first reset interval preceding the first comparison interval in which the first comparison operation is performed on the ramp signal and the reset component and the second reset interval preceding the second comparison interval in which the second comparison operation is performed on the ramp signal and the image component. Therefore, settling time of the comparator may be reduced to increase operating speed of the image sensor 520.

The receiving lens 510 may focus incident light on a photo-receiving region (e.g., depth pixels and/or color pixels) of the image sensor 520. The image sensor chip 520 may generate data DATA1 including depth information and/or color image information based on the incident light passing through the receiving lens 510. For example, the data DATA1 generated by the image sensor chip 520 may include depth data generated using infrared light or near-infrared light emitted by the light source module 530, and red, green, blue (RGB) data of a Bayer pattern generated using external visible light VL. The image sensor 520 may provide the data DATA1 to the engine unit 540 in response to a clock signal CLK. In some embodiments, the image sensor 520 may interface with the engine unit 540 using a mobile industry processor interface (MIPI) and/or a camera serial interface (CSI).

The engine unit 540 may control the image sensor chip 505. The engine unit 540 may process the data DATA1 received from the image sensor 520. For example, the engine unit 540 may generate color data based on the received data DATA1. In other examples, the engine unit 540 may generate luminance, chrominance (YUV) data including a luminance component (Y), a difference between the luminance component and a blue component (U), and a difference between the luminance component and a red component (V) based on the RGB data, or may generate compressed data, such as Joint Photographic Experts Group (JPEG) data. The engine unit 540 may be coupled to a host/application 550, and may provide data DATA2 to the host/application 550 based on a master clock signal MCLK. In some embodiments, the engine unit 540 may interface with the host/application 550 using a serial peripheral interface (SPI) and/or an inter integrated circuit (I2C) interface.

Figure 19:
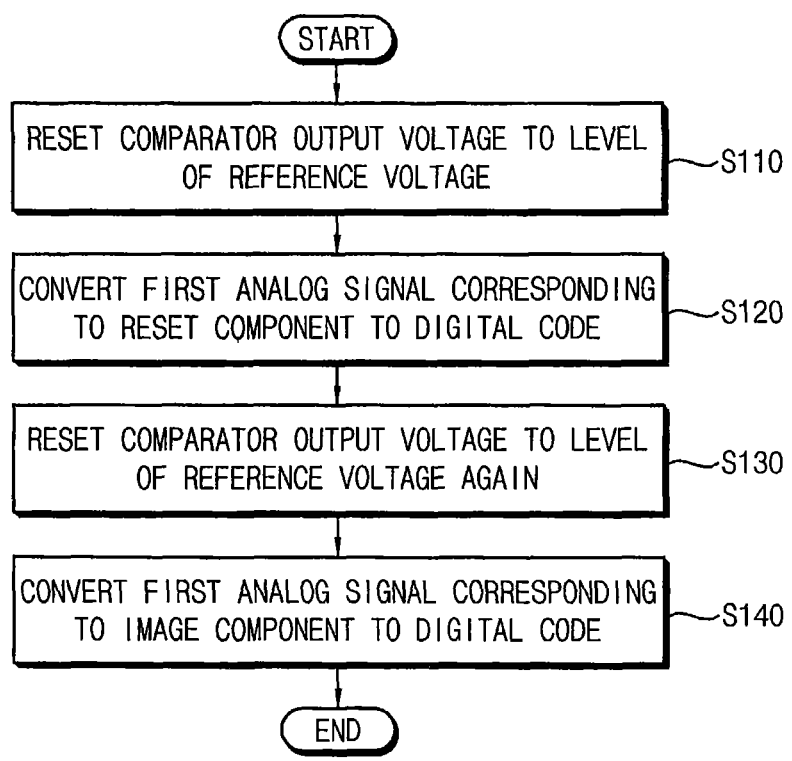
FIG. 19 is a flow chart illustrating a method of analog to digital conversion according to some example embodiments.

FIG. 19 is a flow chart illustrating a method of analog to digital conversion according to some example embodiments. Referring to FIGS. 9, 10 and 19, the output signal VOUT of the comparator 230 in the CDS circuit 200 is reset to the level of the reference voltage VREF in response to the reset control signal RCS during a first reset interval preceding a first comparison interval (S110). A first analog signal corresponding to the reset component of the input signal VIN is converted to a digital code based on the ramp signal RV and the output signal VOUT during the first comparison interval using the counter 161 (S120). The output signal VOUT of the comparator 230 is again reset to the level of the reference voltage VREF in response to the reset control signal RCS during a second reset interval preceding a second comparison interval (S130). A second analog signal corresponding to the image component of the input signal VIN is converted to a digital code based on the ramp signal RV and the output signal VOUT during the second comparison interval using the counter 161 (S140).

According to a method of analog to digital conversion, settling time of the comparator may be reduced to increase operating speed of the analog to digital conversion by resetting the output signal VOUT of the comparator to the level of the reference voltage VREF during the first and second reset intervals.

Figure 20:
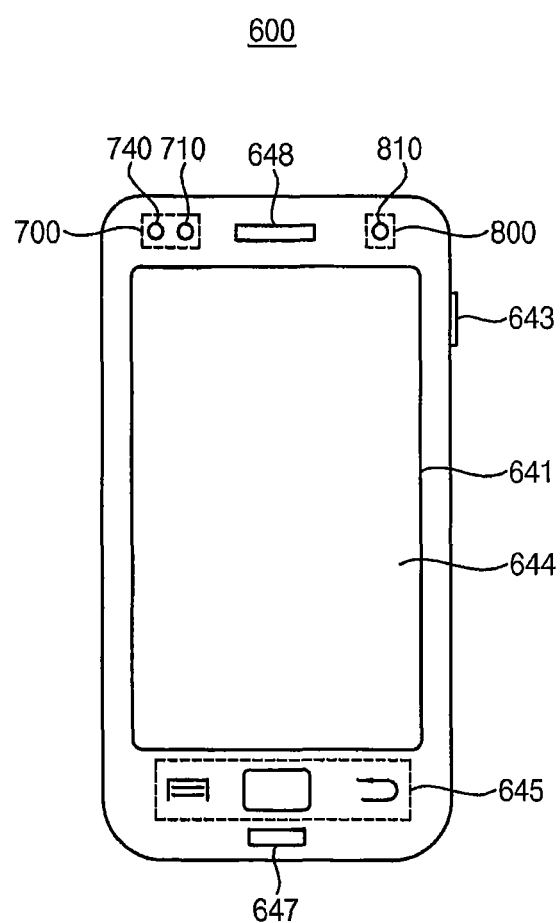
FIG. 20 is a plan view illustrating a mobile device according to some example embodiments.

FIG. 20 is a plan view illustrating a mobile device according to some example embodiments. Referring to FIG. 20, the mobile device 600 includes a 3D image sensor 700, a 2D image sensor 800 and a display device 641. The mobile device 600 may further include a touch screen 644, buttons 643 and 645, a microphone 647 and a speaker 648.

The 3D image sensor 700 is installed on a first surface (for instance, a front surface) of the mobile device 600. The 3D image sensor 700 performs a first sensing to detect proximity of a subject and a second sensing to recognize a gesture of the subject by acquiring distance information for the subject. The 3D image sensor 700 may include a sensing unit 710 having a plurality of depth pixels and a light source unit 740 to emit infrared ray or near-infrared ray.

The 2D image sensor 800 is installed on the first surface of the mobile device 600 and performs a third sensing to acquire color image information for the subject. The 2D image sensor 800 may include a second sensing unit 810 having a plurality of color pixels.

In the example embodiment of FIG. 20, the 3D image sensor 700 and the 2D image sensor 800 may be prepared as two integrated circuit chips separated from each other. That is, the mobile device 600 may include two sensing modules. In this case, the depth pixels and the color pixels may constitute two pixel arrays separated from each other.

The display device 641 is installed on the first surface of the mobile device 600 to display the results of the first sensing, the second sensing and the third sensing.

Figure 21:
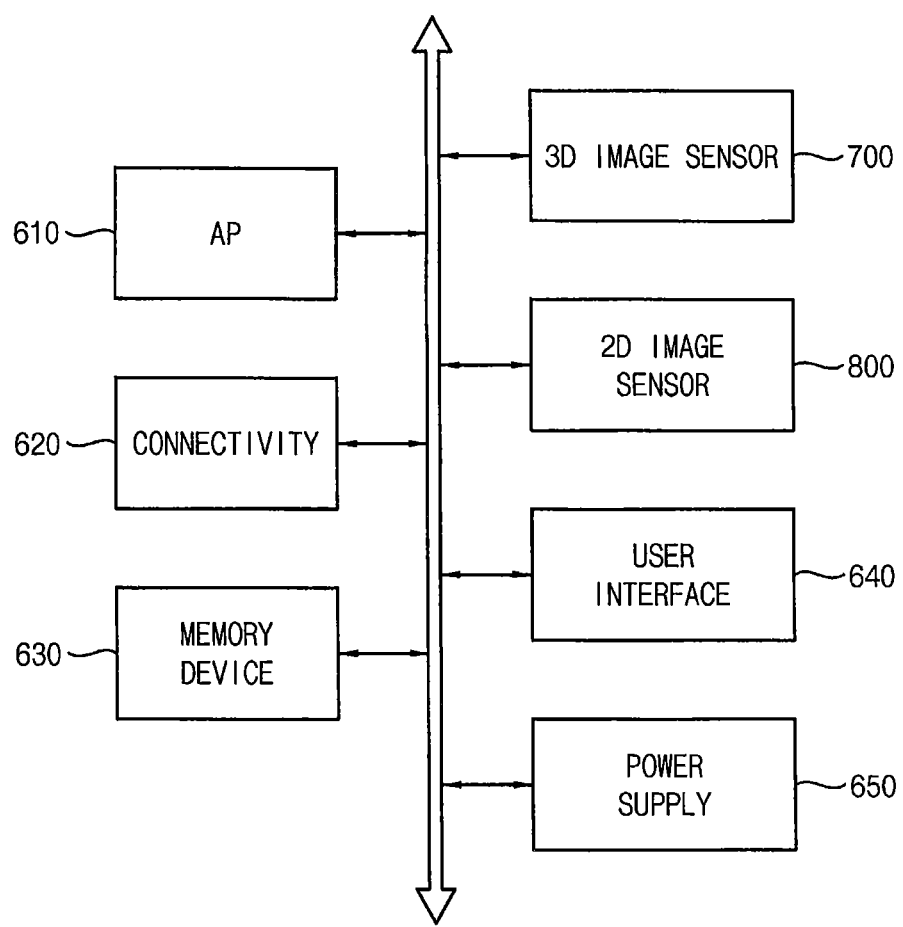
FIG. 21 is a block diagram illustrating the mobile device shown in FIG. 20.

FIG. 21 is a block diagram illustrating the mobile device shown in FIG. 20. Referring to FIG. 21, the mobile device 600 includes an application processor 610, a connectivity unit 620, a memory device 630, a 3D image sensor 700, a 2D image sensor 800 a user interface 640 and a power supply 650. According to example embodiments, the mobile device 600 may be a predetermine mobile system, such as a mobile phone, a smart phone, a tablet PC, a laptop computer, a PDA (Personal Digital Assistant), a PMP (Portable Multimedia Player), a digital camera, a music player, a portable game console or a navigation system.

The application processor 610 may execute an operating system (OS) to operate the mobile device 600. In addition, the application processor 610 may execute various applications to provide an interne browser, a game and a dynamic image. According to example embodiments, the application processor 610 may include a single core or multi-cores. In addition, according to example embodiments, the application processor 610 may further include a cache memory positioned inside or outside the application processor 610.

The connectivity unit 620 can make communication with external devices. For instance, the connectivity unit 620 can perform the USB (Universal Serial Bus) communication, Ethernet communication, NFC (Near Field Communication), RFID (Radio Frequency Identification) communication, mobile telecommunication or memory card communication. For instance, the connectivity unit 620 may include a baseband chipset and may support communications, such as GSM, GPRS, WCDMA and HSxPA.

The memory device 630 may store data processed by the application processor 1010 or may operate as a working memory. In addition, the memory device 630 may store a bottom image for booting the mobile device 600, a file system related to the operating system to operate the mobile device 600, a device driver related to external devices connected to the mobile device 600, and the applications executed in the mobile device 600. For instance, the memory device 630 may include a volatile memory, such as DRAM (Dynamic Random Access Memory), SRAM (Static Random Access Memory), mobile DRAM, DDR SDRAM, LPDDR SDRAM, GDDR SDRAM or RDRAM, or may include a nonvolatile memory, such as EEPROM (Electrically Erasable Programmable Read-Only Memory), Flash Memory, PRAM (Phase Change Random Access Memory), RRAM (Resistance Random Access Memory), NFGM (Nano Floating Gate Memory), PoRAM (Polymer Random Access Memory), MRAM (Magnetic Random Access Memory), or FRAM (Ferroelectric Random Access Memory).

The 3D image sensor 700 may perform the first sensing and the second sensing. The 2D image sensor 800 may perform the third sensing The user interface 640 may include at least one input device, such as a keypad, the buttons 643 and 645 or the touch screen 644, and/or at least one output device, such as the speaker 648 or the display device 641. The power supply 650 may supply operating voltage to the mobile system 600.

The mobile device 600 or components of the mobile device 600 may be mounted by using various types of packages, such as PoP (Package on Package), BGAs (Ball grid arrays), CSPs (Chip scale packages), PLCC (Plastic Leaded Chip Carrier), PDIP (Plastic Dual In-Line Package), Die in Waffle Pack, Die in Wafer Form, COB (Chip On Board), CERDIP (Ceramic Dual In-Line Package), MQFP (Plastic Metric Quad Flat Pack), TQFP (Thin Quad Flat-Pack), SOIC (Small Outline Integrated Circuit), SSOP (Shrink Small Outline Package), TSOP (Thin Small Outline Package), TQFP (Thin Quad Flat-Pack), SIP (System In Package), MCP (Multi Chip Package), WFP (Wafer-level Fabricated Package), and WSP (Wafer-Level Processed Stack Package).

Figure 22:
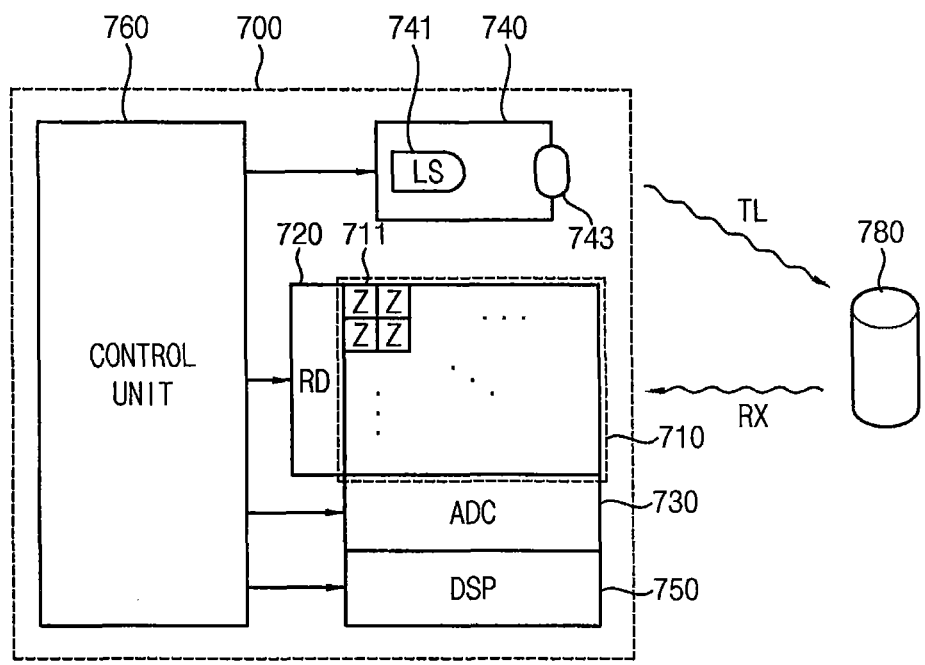
FIG. 22 is a block diagram illustrating an example of the 3D image sensor included in the mobile device shown in FIG. 20.

FIG. 22 is a block diagram illustrating an example of the 3D image sensor included in the mobile device shown in FIG. 20. Referring to FIG. 22, the 3D image sensor 700 may include a sensing unit 710, an RD (row driving) unit 720, an ADC (Analog-to-Digital Converting) unit 730, a light source unit 740, a DSP (Digital Signal Processing) unit 750 and a control unit 760. The light source unit 740 may output light TL having a predetermined wavelength (for instance, infrared ray or near-infrared ray). The light source unit 740 may be selectively activated or may emit lights having mutually different brightness according to the operation mode. The light source unit 740 may include a light source 741 and a lens 743. The light source 741 may generate the light TL. For instance, the light source 741 may be realized as an LED (light emitting diode) or a laser diode. In one example embodiment, the light source 741 may generate light having intensity modulated to be periodically changed. For instance, the intensity of the light TL may be modulated in the form of a pulse wave having continuous pulses, a sine wave or a cosine wave. In another example embodiment, the light source 741 may generate light having constant intensity, that is, non-modulated light. The lens 741 can concentrate the light TL emitted from the light source 741 onto a subject 780.

The sensing unit 710 receives light RX reflected from the subject 780 to convert the light RX into an electric signal. In one example embodiment, the received light RX may be generated based on infrared ray or near-infrared ray TL emitted from the light source unit 140. In another example embodiment, the received light RX may be generated based on infrared ray or near-infrared ray included in ambient light. In still another example embodiment, the received light RX may be generated based on visible ray included in the ambient light. In still yet another example embodiment, the received light RX may be generated based on both infrared ray or near-infrared ray and visible ray.

The sensing unit 710 may include a plurality of depth pixels 711. All or part of the depth pixels 711 may be activated according to the operation mode. The depth pixels 711 are aligned in the form of a pixel array and provide information about the distance between the 3D image sensor 700 and the subject 780. For instance, an infrared filter or a near-infrared filter may be formed on the depth pixels 711. In the depth pixels 711, at least one of the first and second portions of the transfer gate in a longitudinal direction is not overlapped with the isolation region, thereby to suppress generation of noisy electrons to enhance dark characteristic.

The row driving unit 720 is connected to each row of the sensing unit 710 to generate a driving signal to drive each row. For instance, the row driving unit 720 can drive the depth pixels 711, which are included in the sensing unit 710, in a unit of row.

The ADC unit 730 is connected to each column of the sensing unit 710 to convert an analog signal output from the sensing unit 710 into a digital signal. In one example embodiment, the ADC unit 730 includes a plurality of analog-digital converters and can perform the column ADC to convert the analog signals output from each column line into the digital signals in parallel (that is, concurrently). In another example embodiment, the ADC unit 730 includes a single analog-digital converter and can perform the single ADC to sequentially convert the analog signals into the digital signals.

According to example embodiments, the ADC unit 730 may include a CDS (Correlated Double Sampling) unit to extract effective signal components. In one example embodiment, the CDS unit may perform the analog double sampling to extract the effective signal components based on difference between an analog reset signal representing a reset component and an analog data signal representing a signal component. In another example embodiment, the CDS unit may perform the digital double sampling to extract the effective signal components based on difference between two digital signals after converting the analog reset signal and the analog data signal into the two digital signals. In still another example embodiment, the CDS unit may perform the dual correlated double sampling by performing both of the analog double sampling and the digital double sampling. The CDS unit may include a plurality of CDS circuits as illustrated in FIG. 2 and each CDS circuit may include a sampling unit that employs a comparator and an output reset unit that employs a reset switch. Therefore, the CDS unit resets the output signal of the comparator to the level of the reference voltage in response to the reset control signal which is activated during at least one of the first reset interval preceding the first comparison interval in which the first comparison operation is performed on the ramp signal and the reset component and the second reset interval preceding the second comparison interval in which the second comparison operation is performed on the ramp signal and the image component. Therefore, settling time of the comparator may be reduced to increase operating speed of the ADC unit 730.

The DSP unit 750 receives the digital signal output from the ADC unit 730 to perform the image data processing with respect to the digital signal. For instance, the DSP unit 750 may perform the image interpolation, color correction, white balance, gamma correction and color conversion.

The control unit 760 may control the row driving unit 720, the ADC unit 730, the light source unit 740 and the DSP unit 750. The control unit 760 may supply control signals, such as clock signals and timing control signals required to operate the row driving unit 720, the ADC unit 730, the light source unit 740 and the DSP unit 750. In one example embodiment, the control unit 760 may include a logic control circuit, a PLL (Phase Lock Loop) circuit, a timing control circuit and a communication interface circuit.

Figure 23:
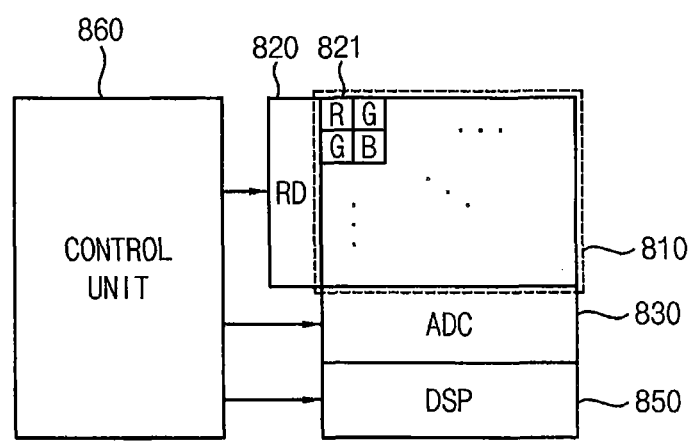
FIG. 23 is a block diagram illustrating an example of the 2D image sensor included in the mobile device shown in FIG. 20.

FIG. 23 is a block diagram illustrating an example of the 2D image sensor included in the mobile device shown in FIG. 20. Referring to FIG. 23, the 2D image sensor 800 may include a sensing unit 810, a row driving unit 820, an ADC (Analog-to-Digital Converting) unit 830, a DSP (Digital Signal Processing) unit 850 and a control unit 860.

The sensing unit 810 may convert incident light (for instance, visible ray) into an electric signal. The sensing unit 810 may include a plurality of color pixels 811. The color pixels 811 are aligned in the form of a pixel array and provide information about the color image for the subject. For instance, a red filter, a green filter and a blue filter may be formed on the color pixels 811. In another example embodiment, a yellow filter, a cyan filter and a magenta filter may be formed on the color pixels 811. In the color pixels, at least one of the first and second portions of the transfer gate in a longitudinal direction is not overlapped with the isolation region, thereby to suppress generation of noisy electrons to enhance dark characteristic.

The row driving unit 820 is connected to each row of the second sensing unit 810 to generate a driving signal to drive each row. The ADC unit 830 is connected to each column of the second sensing unit 810 to convert an analog signal output from the second sensing unit 810 into a digital signal. According to example embodiments, the ADC unit 830 may include a CDS unit to extract effective signal components. The DSP unit 850 receives the digital signal output from the ADC unit 830 to perform the image data processing with respect to the digital signal. The control unit 860 may control the row driving unit 820, the ADC unit 830, and the DSP unit 850.

The ADC unit 830 may include a CDS unit to extract effective signal components. The CDS unit may include a plurality of CDS circuits as illustrated in FIG. 2 and each CDS circuit may include a sampling unit that employs a comparator and an output reset unit that employs a reset switch. Therefore, the CDS unit resets the output signal of the comparator to the level of the reference voltage in response to the reset control signal which is activated during at least one of the first reset interval preceding the first comparison interval in which the first comparison operation is performed on the ramp signal and the reset component and the second reset interval preceding the second comparison interval in which the second comparison operation is performed on the ramp signal and the image component. Therefore, settling time of the comparator may be reduced to increase operating speed of the ADC unit 830.

Figure 24:
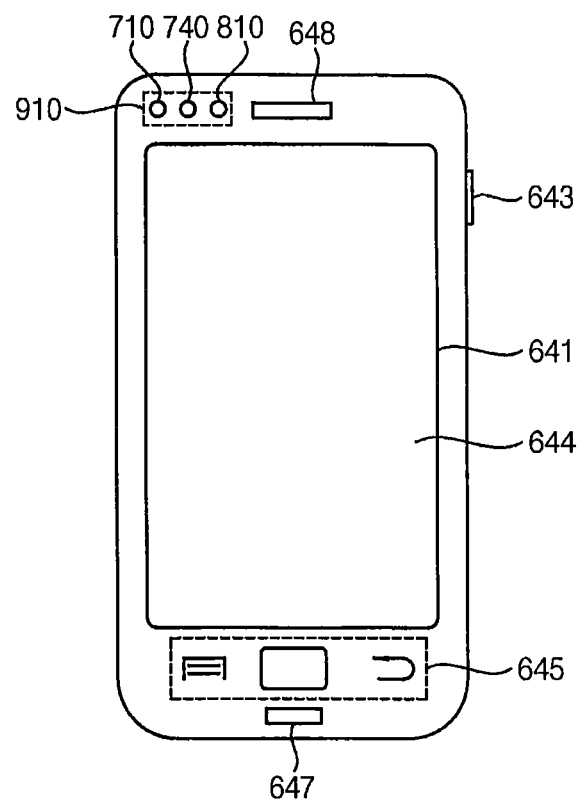
FIG. 24 is a plan view illustrating the mobile device according to some example embodiments.

FIG. 24 is a plan view illustrating the mobile device according to some example embodiments. Referring to FIG. 24, the mobile device 900 includes an image sensor 910 and a display device 641. The mobile device 900 may further include a touch screen 644, buttons 643 and 645, a microphone 647 and a speaker 648.

The image sensor 910 is installed on a first surface (for instance, a front surface) of the mobile device 900. The image sensor 910 performs a first sensing to detect proximity of a subject, a second sensing to recognize a gesture of the subject by acquiring distance information for the subject and a third sensing to acquire color image information for the subject. The image sensor 910 may include a first sensing unit 710 having a plurality of depth pixels, a light source unit 740 to emit infrared ray or near-infrared ray and a second sensing unit 810 having a plurality of color pixels.

In the example embodiment of FIG. 24, a 3D image sensor and a 2D image sensor may be prepared as one integrated circuit chip. That is, the mobile device 900 may include one sensing module. In this case, the depth pixels and the color pixels may constitute two pixel arrays separated from each other. In the depth pixels and the color pixels, at least one of the first and second portions of the transfer gate in a longitudinal direction is not overlapped with the isolation region, thereby to suppress generation of noisy electrons to enhance dark characteristic.

The display device 641 is installed on the first surface of the mobile device 900 to display the results of the first sensing, the second sensing and the third sensing.

The mobile device 900 of FIG. 24 is substantially identical to the mobile device 600 of FIG. 20 except that the 3D image sensor and the 2D image sensor of the mobile device 900 are prepared as one integrated circuit chip.

Figure 25:
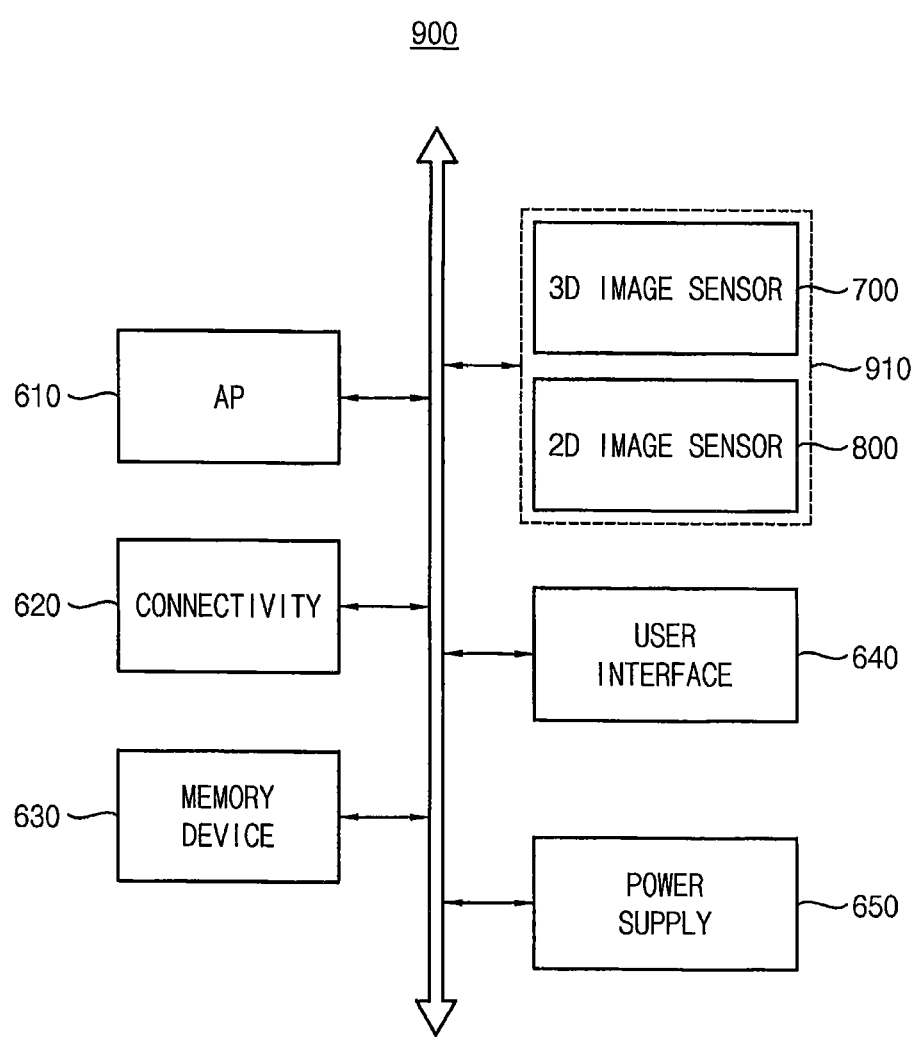
FIG. 25 is a block diagram illustrating an example of the mobile device shown in FIG. 24.

FIG. 25 is a block diagram illustrating an example of the mobile device shown in FIG. 24. Referring to FIG. 25, the mobile device 900 includes an application processor 610, a connectivity unit 620, a memory device 630, an image sensor 910, a user interface 640 and a power supply 650.

Figure 26:
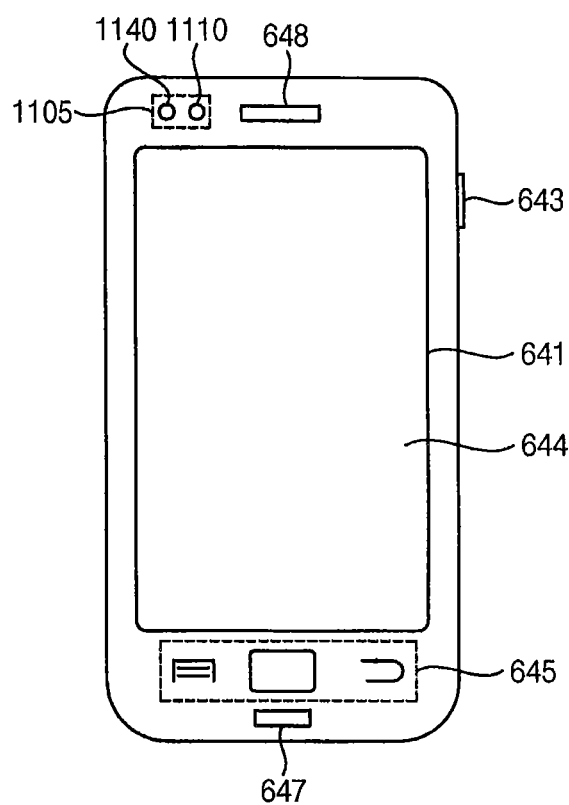
FIG. 26 is a plan view illustrating the mobile device according to example embodiments.

When comparing with the mobile device 600 of FIG. 21, the mobile device 900 of FIG. 26 may further include the image sensor 910 where the 3D image sensor 700 and the 2D image sensor 800 are integrated.

The image sensor 910 may perform the first sensing, the second sensing and the third sensing. For instance, the image sensor 910 may primarily perform the first sensing and at least one of the second sensing and the third sensing may be performed based on the result of the first sensing.

FIG. 26 is a plan view illustrating the mobile device according to example embodiments. Referring to FIG. 26, the mobile device 1100 includes an image sensor 1105 and a display device 641. The mobile device 1100 may further include a touch screen 644, buttons 643 and 645, a microphone 647 and a speaker 648.

The image sensor 1105 is installed on a first surface (for instance, a front surface) of the mobile device 1100. The image sensor 1105 performs a first sensing to detect proximity of a subject, a second sensing to recognize a gesture of the subject by acquiring distance information for the subject and a third sensing to acquire color image information for the subject. The image sensor 1105 may include a sensing unit 1110 having a plurality of depth pixels and color pixels and a light source unit 1140 to emit infrared ray or near-infrared ray.

In the example embodiment of FIG. 26, a 3D image sensor and a 2D image sensor may be prepared as one integrated circuit chip. That is, the mobile device 1100 may include one sensing module. In this case, the depth pixels and the color pixels may constitute one pixel array. In detail, the image sensor 1105 may be a 3D color image sensor, for instance, an RGBZ sensor. In the depth pixels and the color pixels, at least one of the first and second portions of the transfer gate in a longitudinal direction is not overlapped with the isolation region, thereby to suppress generation of noisy electrons to enhance dark characteristic.

The display device 641 is installed on the first surface of the mobile device 1100 to display the results of the first sensing, the second sensing and the third sensing.

The mobile device 1100 of FIG. 26 is substantially identical to the mobile device 600 of FIG. 20 except that the 3D image sensor and the 2D image sensor of the mobile device 1100 are prepared as one integrated circuit chip and the depth pixels and the color pixels constitute one pixel array.

Figure 27:
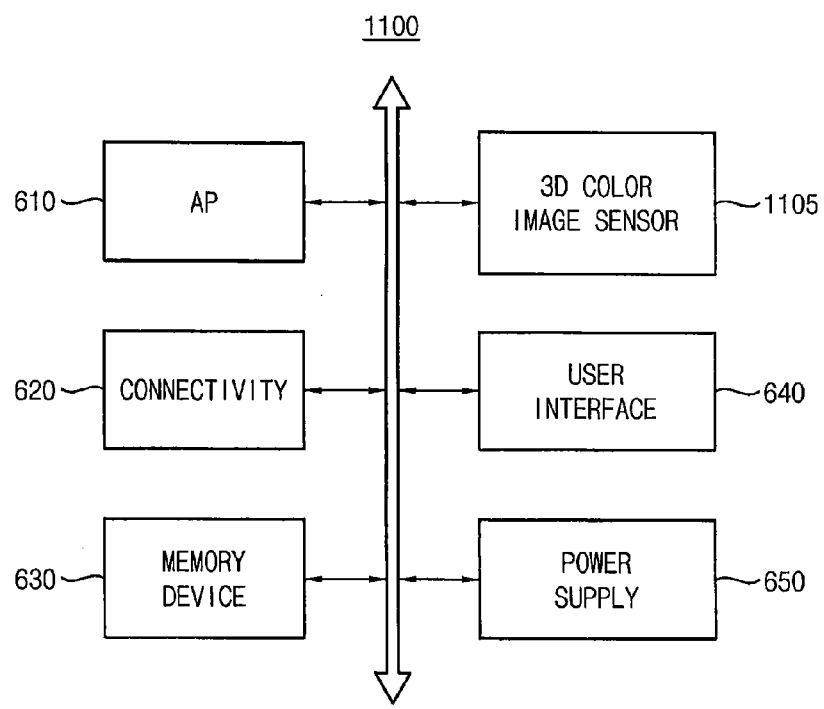
FIG. 27 is a block diagram illustrating an example of the mobile device shown in FIG. 26.

FIG. 27 is a block diagram illustrating an example of the mobile device shown in FIG. 26. Referring to FIG. 27, the mobile device 1100 includes an application processor 610, a connectivity unit 620, a memory device 630, an image sensor 1105, a user interface 640 and a power supply 650.

When comparing with the mobile device 600 of FIG. 21, the mobile device 1100 of FIG. 27 may further include the 3D color image sensor 1105 where the 3D image sensor and the 2D image sensor are integrated and a plurality of depth pixels and color pixels constitute one pixel array.

The image sensor 1105 may perform the first sensing, the second sensing and the third sensing. For instance, the image sensor 1105 may primarily perform the first sensing and at least one of the second sensing and the third sensing may be performed based on the result of the first sensing.

Figure 28:
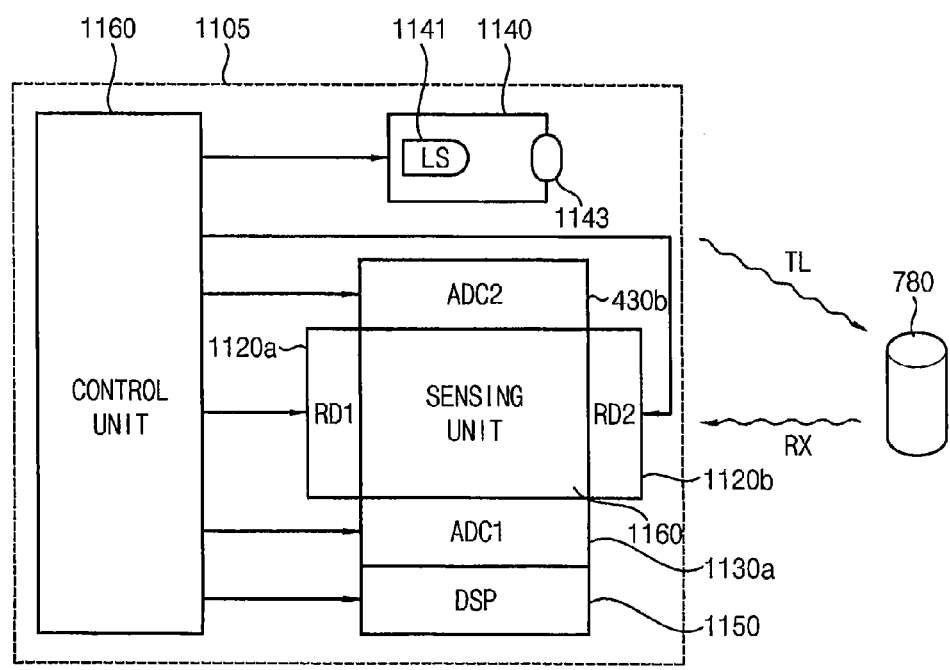
FIG. 28 is a block diagram illustrating an example of the image sensor included in the mobile device shown in FIG. 27.
Figure 29:
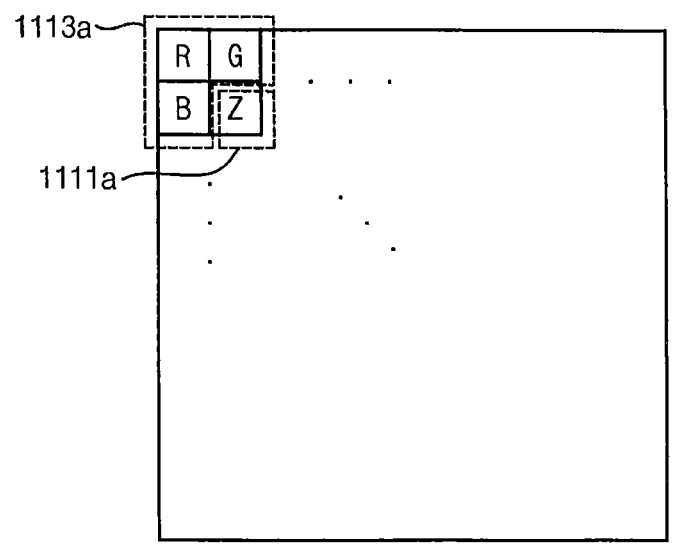
FIGS. 29 and 30 are views illustrating examples of sensing units (e.g., circuits) included in the image sensor shown in FIG. 28.
Figure 30:
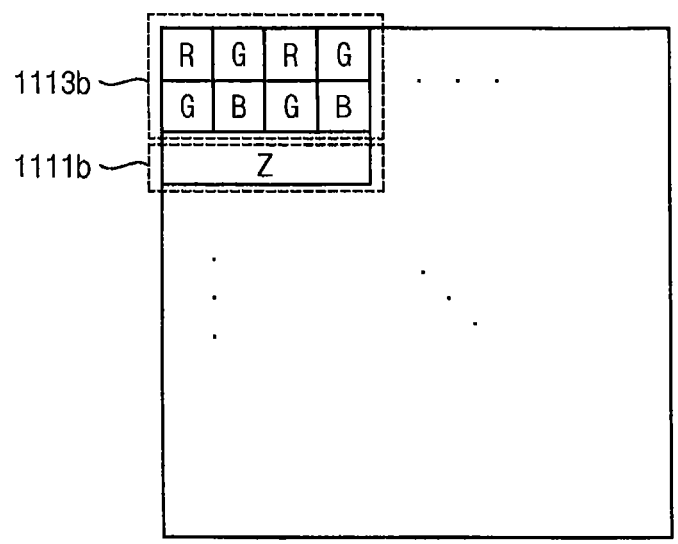

FIG. 28 is a block diagram illustrating an example of the image sensor included in the mobile device shown in FIG. 27. FIGS. 29 and 30 are views illustrating examples of sensing units included in the image sensor shown in FIG. 28. Referring to FIG. 28, the mage sensor 1105 may include a sensing unit 1110, a first row driving unit 1120a, a first ADC unit 1130a, a second ADC unit 1130b, a light source unit 1140, a DSP (Digital Signal Processing) unit 1150 and a control unit 1160.

The light source unit 1140 may output light TL having a predetermined wavelength (for instance, infrared ray or near-infrared ray). The light source unit 1140 may be selectively activated or emit lights having mutually different brightness according to the operation mode. The light source unit 1140 may include a light source 1141 to generate the light TL and a lens 1143 to concentrate the light onto the subject 180.

The sensing unit 1110 may provide distance information by receiving light RX reflected from the subject 180 and converting the light RX into an electric signal. In addition, the sensing unit 1110 may provide color image information by converting incident light (for instance, visible ray) into an electric signal.

The sensing unit 1110 may include a plurality of depth pixels and color pixels. According to example embodiments, the depth pixels and color pixels may be included in the sensing unit 1110 with various number ratios and size ratios. For instance, a sensing unit 1110a may include depth pixels 1111a and color pixels 1113a as shown in FIG. 36 or a sensing unit 1110b may include depth pixels 1111b and color pixels 1113b as shown in FIG. 37. In one example embodiment, an infrared filter (or near-infrared filter) is formed over the depth pixels and color filters (for instance, red, green and blue filters) are formed over the color pixels. In the depth pixels and the color pixels, at least one of the first and second portions of the transfer gate in a longitudinal direction is not overlapped with the isolation region, thereby to suppress generation of noisy electrons to enhance dark characteristic.

The first row driving unit 1120a is connected to each row of the color pixels and may generate a first driving signal to drive each row of the color pixels. The second row driving unit 1120b is connected to each row of the depth pixels and may generate a second driving signal to drive each row of the depth pixels. The first ADC unit 1130a is connected to each column of the color pixels and may convert a first analog signal output from each column of the color pixels into a first digital signal. The second ADC unit 1130b is connected to each column of the depth pixels and may convert a second analog signal output from each column of the depth pixels into a second digital signal. The DSP unit 1150 receives the first and second digital signals output from the first and second ADC units 1130a and 1130b to perform the image data processing with respect to the first and second digital signals. The control unit 1160 may control the first row driving unit 1120a, the second row driving unit 1120b, the first ADC unit 1130a, the second ADC unit 1130b, the light source unit 1140 and the DSP unit 1150.

Each of the first and second ADC units 1130a and 1130b may include a plurality of CDS circuits as illustrated in FIG. 2 and each CDS circuit may include a sampling unit that employs a comparator and an output reset unit that employs a reset switch. Therefore, the CDS unit resets the output signal of the comparator to the level of the reference voltage in response to the reset control signal which is activated during at least one of the first reset interval preceding the first comparison interval in which the first comparison operation is performed on the ramp signal and the reset component and the second reset interval preceding the second comparison interval in which the second comparison operation is performed on the ramp signal and the image component. Therefore, settling time of the comparator may be reduced to increase operating speed of the ADC units 1130a 1130b.

FIG. 31 is a block diagram illustrating an example of an interface used in the mobile device according to example embodiments. Referring to FIG. 31, the mobile device 2000 may be implemented as a data processing device (for instance, a portable phone, a personal digital assistant, a portable multimedia player, or a smart phone) that uses or supports an MIPI interface, and may include an application processor 2110, an image sensor 2140 and a display 2150.

A CSI host 2112 of the application processor 2110 can make serial communication with a CSI device 2141 of the image sensor 2140 through a camera serial interface (CSI). In one embodiment, the CSI host 2112 may include an optical serializer DES and the CSI device 2141 may include an optical serializer SER. A DSI host 2111 of the application processor 2110 can make serial communication with a DSI device 2151 of the display 2150 through a display serial interface (DSI). In one embodiment, the DSI host 2111 may include an optical serializer SER and the DSI device 2151 may include an optical serializer DES.

In addition, the mobile device 2000 may further include an RF (radio frequency) chip 2160 which can make communication with the application processor 2110. Data may be transceived between a PHY 2113 of the mobile device 2000 and a PHY 2161 of the RF chip 2160 according to the MIPI (Mobile Industry Processor Interface) DigRF. In addition, the application processor 2110 may further include a DigRF MASTER 2114 to control data transmission according to the MIPI DigRF and the RF chip 2160 may further include a DigRF SLAVE 2162 which is controlled by the DigRF MASTER 2114.

Meanwhile, the mobile device 2000 may include a GPS (Global Positioning System) 2120, a storage 2170, a microphone 2180, a DRAM (Dynamic Random Access Memory) 2185 and a speaker 2190. In addition, the mobile device 2000 can perform the communication using a UWB (Ultra WideBand) 2210, a WLAN (Wireless Local Area Network) 2220 and a WIMAX (Worldwide Interoperability for Microwave Access) 2230. The structure and the interface of the mobile device 2000 are illustrative purposes only and example embodiments may not be limited thereto.

As described above, the CDS circuit resets the output signal of the comparator to the level of the reference voltage in response to the reset control signal which is activated during at least one of the first reset interval preceding the first comparison interval in which the first comparison operation is performed on the ramp signal and the reset component and the second reset interval preceding the second comparison interval in which the second comparison operation is performed on the ramp signal and the image component. Therefore, settling time of the comparator may be reduced to increase operating speed.

Example embodiments can be applied to various image sensors and image systems. For instance, example embodiments can be applied to various terminals, such as a mobile phone, a smart phone, a tablet PC, a laptop computer, a personal digital assistant (PDA), a portable multimedia player (PMP), a digital camera, a music player, a portable game console and a navigation.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An integrated circuit device, comprising:
a sampling circuit comprising a comparator having a first input terminal connected to a ramp signal, a second input terminal connected to an input signal from an image-sensor pixel array and an output terminal, the sampling circuit configured to perform a correlated double sampling (CDS) operation on a reset component of the input signal and an image component of the input signal; and
a reset circuit having a first terminal connected to a reference signal and a second terminal connected to the output terminal of the comparator, the reset circuit configured to provide an output signal at the output terminal of the comparator with a first voltage in response to a reset control signal, which is active during at least one of a first reset interval and a second reset interval, said first reset interval preceding a first comparison interval during which a first comparison operation is performed on the ramp signal and the reset component, and said second reset interval preceding a second comparison interval during which a second comparison operation is performed on the ramp signal and the image component,
wherein the reset control signal is inactive during the first comparison interval and during the second comparison interval.

2. The integrated circuit device of claim 1, wherein said comparator comprises a differential amplifier having a first input connected to the ramp signal and a second input connected to the input signal.

3. The integrated circuit device of claim 2, wherein a node of the differential amplifier is electrically connected to a pull-up bias circuit or a pull-down bias circuit.

4. The integrated circuit device of claim 1, further comprising an auto-zero switch connected to the output terminal of the sampling circuit and the second input terminal of the sampling circuit, the auto zero switch configured to turn on by an auto zero control signal during an auto-zero time interval, which precedes the first comparison interval.

5. The integrated circuit device of claim 2, wherein the input signal is provided to a node that is capacitively coupled to the second input terminal of the comparator.

6. The integrated circuit device of claim 1, further comprising a digital signal generation circuit configured to perform a digital conversion operation on the output signal.

7. An analog to digital converter (ADC) comprising:
a correlated double sampling (CDS) circuit configured to sample an input signal to generate an output signal, the input signal being provided from a pixel array; and
a digital signal generation unit configured to perform a digital conversion operation on the output signal to generate a digital signal, wherein the CDS circuit comprises:
a sampling unit configured to perform a CDS operation on a reset component of the input signal and an image component of the input signal based on a ramp signal and configured to generate the output signal;
an output reset unit configured to reset the output signal to a level of a reference voltage provided to the output reset unit based on a reset control signal which is activated during at least one of a first reset interval and a second reset interval, the first reset interval preceding a first comparison interval in which a first comparison operation is performed on the ramp signal and the reset component, the second reset interval preceding a second comparison interval in which a second comparison operation is performed on the ramp signal and the image component; and an auto-zero switch configured to connect the output signal and the input signal by an auto zero control signal during an auto-zero time interval, which precedes the first comparison interval, wherein the output reset unit includes a reset switch that connects the reference voltage to an output node during at least one of the first and second reset interval, wherein the reset control signal is inactive during the first comparison interval and during the second comparison interval.

8. The ADC of claim 7, wherein the sampling unit includes a comparator that compares the ramp signal and the input signal to provide the output signal at the output node.

9. The ADC of claim 7, wherein the digital signal generation unit includes a counter that counts an input clock signal based on the output signal to generate the digital signal during each of the first and second comparison intervals.

10. The ADC of claim 7, wherein the digital signal generation unit includes a latch circuit that latches a counter clock signal based on the output signal to generate the digital signal during each of the first and second comparison intervals.

11. An image sensor comprising:
a pixel array including a plurality of unit pixels configured to sense an incident light to generate pixel signals corresponding to the incident light;
a correlated double sampling (CDS) block configured to perform CDS operation on the pixel signals to generate output signals; and
a digital signal generation unit configured to perform digital conversion operation on the output signals to generate digital signals corresponding to the output signals,
wherein the CDS block includes a plurality of CDS circuits, each connected to each column line of the pixel array, and each of the CDS circuits includes:
a sampling unit configured to perform a CDS operation on a reset component of the pixel signal and an image component of the pixel signal based on a ramp signal and configured to generate the output signal; and
an output reset unit configured to reset the output signal to a level of a reference voltage based on a reset control signal which is activated during both of a first reset interval and a second reset interval, the first reset interval preceding a first comparison interval in which a first comparison operation is performed on the ramp signal and the reset component, the second reset interval preceding a second comparison interval in which a second comparison operation is performed on the ramp signal and the image component,
wherein the output reset unit includes a reset switch that connects the reference voltage to an output node during both of the first and second reset interval, and
wherein the reset control signal is inactive during the first comparison interval and during the second comparison interval.

12. The image sensor of claim 11, wherein the sampling unit includes a comparator that compares the ramp signal and the pixel signal to provide the output signal at the output node.

13. The image sensor of claim 11, wherein the digital signal generation unit includes a plurality of counters, each connected to each of the CDS circuits and each of the counters counts an input clock signal based on the output signal to generate the digital signal during each of the first and second comparison intervals.

14. The image sensor of claim 13, further comprising:
a control unit that provides the input clock signal to the counters.

15. The image sensor of claim 11, wherein the digital signal generation unit includes a plurality of latch circuits, each connected to each of the CDS circuits and each of the latch circuit latches a counter clock signal based on the output signal to generate the digital signal during each of the first and second comparison intervals.

16. The image sensor of claim 15, further comprising:
a global counter that generates the counter clock signal to the latch circuits.

17. The integrated circuit device of claim 1, wherein the reference voltage has a level of a power supply voltage or a ground voltage.

18. The integrated circuit device of claim 1, wherein the reset control signal is active during both the first reset interval and the second reset interval.

* * * * *